(12) United States Patent
Raghunathan et al.

(10) Patent No.: US 12,561,151 B1
(45) Date of Patent: Feb. 24, 2026

(54) MODULAR DATA ACQUISITION AND ANALYSIS SYSTEM AND METHODS THEREOF

(71) Applicant: Pramana, Inc., Cambridge, MA (US)

(72) Inventors: Bharathwaj Raghunathan, Oakville (CA); Abhishek Garhia, Bangalore (IN); Raghubansh Bahadur Gupta, Bangalore (IN); Suhash Gerald, Bengaluru (IN); Venkata Veera Lokeshkumar Puvvada, Guntur (IN); Prateek Jain, Karnataka (IN); Falgun Meshram, Toronto (CA); Huai-An Jeng, Toronto (CA); Prasanth Perugupalli, Cary, NC (US)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 19/085,158

(22) Filed: Mar. 20, 2025

(51) Int. Cl.
| | |
|---|---|
| *G06F 3/0482* | (2013.01) |
| *G06F 9/451* | (2018.01) |
| *G06F 40/205* | (2020.01) |
| *G06Q 10/0631* | (2023.01) |

(52) U.S. Cl.
CPC ............ *G06F 9/451* (2018.02); *G06F 3/0482* (2013.01); *G06F 40/205* (2020.01); *G06Q 10/06316* (2013.01)

(58) Field of Classification Search
CPC .................................................. G06F 3/048–05
See application file for complete search history.

(56) References Cited

U.S. PATENT DOCUMENTS

| | | | | |
|---|---|---|---|---|
| 8,515,920 | B2 * | 8/2013 | Peyton ...................... | G06F 7/00 |
| | | | | 707/694 |
| 9,563,861 | B2 | 2/2017 | Weatherhead et al. | |
| 10,776,686 | B1 | 9/2020 | Jacob et al. | |
| 12,169,802 | B1 * | 12/2024 | Eldan ...................... | G06F 40/186 |
| 12,265,801 | B1 * | 4/2025 | Geigel .................. | G06F 3/0486 |
| 2005/0282137 | A1 * | 12/2005 | Sasinowski .............. | G09B 7/02 |
| | | | | 434/350 |
| 2008/0097816 | A1 * | 4/2008 | Freire .................... | G06Q 10/10 |
| | | | | 705/7.26 |
| 2010/0299631 | A1 * | 11/2010 | Chow .................. | H04N 1/0097 |
| | | | | 715/806 |
| 2011/0276915 | A1 * | 11/2011 | Freire .................... | G06Q 10/00 |
| | | | | 715/772 |
| 2013/0246345 | A1 * | 9/2013 | Eisler ...................... | G06F 16/93 |
| | | | | 707/608 |
| 2013/0290963 | A1 | 10/2013 | Simske et al. | |
| 2014/0089825 | A1 * | 3/2014 | Lee .......................... | G06F 3/048 |
| | | | | 715/762 |

(Continued)

*Primary Examiner* — Daniel Rodriguez
(74) *Attorney, Agent, or Firm* — Caldwell Intellectual Property Law

(57) ABSTRACT

A modular data acquisition and analysis system may include at least a processor and a memory communicatively connected to the at least a processor, wherein the memory contains instructions configuring the at least a processor to receive, from a module database, a library of interoperable modules, receive, from a user interface, a module selection, generate an interface, receive a user input through the interface, update the interface as a function of the user input, define a customized workflow as a function of the user input, and save the customized workflow for subsequent execution.

14 Claims, 10 Drawing Sheets

200

(56)        References Cited

U.S. PATENT DOCUMENTS

| | | | |
|---|---|---|---|
| 2014/0282177 A1* | 9/2014 | Wang | G16B 50/00 |
| | | | 715/771 |
| 2016/0085399 A1* | 3/2016 | Jain | H04L 65/80 |
| | | | 715/738 |
| 2016/0098037 A1* | 4/2016 | Zornio | H04L 43/045 |
| | | | 700/20 |
| 2016/0358130 A1* | 12/2016 | Capurro | G06Q 30/0613 |
| 2017/0236067 A1* | 8/2017 | Tjiong | G05B 23/0229 |
| | | | 706/11 |
| 2018/0089591 A1* | 3/2018 | Zeiler | G06N 3/045 |
| 2020/0241852 A1* | 7/2020 | Vidan | G06F 8/34 |
| 2024/0095006 A1 | 3/2024 | Waterman | |
| 2024/0265275 A1* | 8/2024 | Zhang | G06N 5/01 |
| 2025/0077067 A1* | 3/2025 | Khanna | G06F 8/34 |
| 2025/0130545 A1* | 4/2025 | Zhou | G06F 8/437 |

* cited by examiner

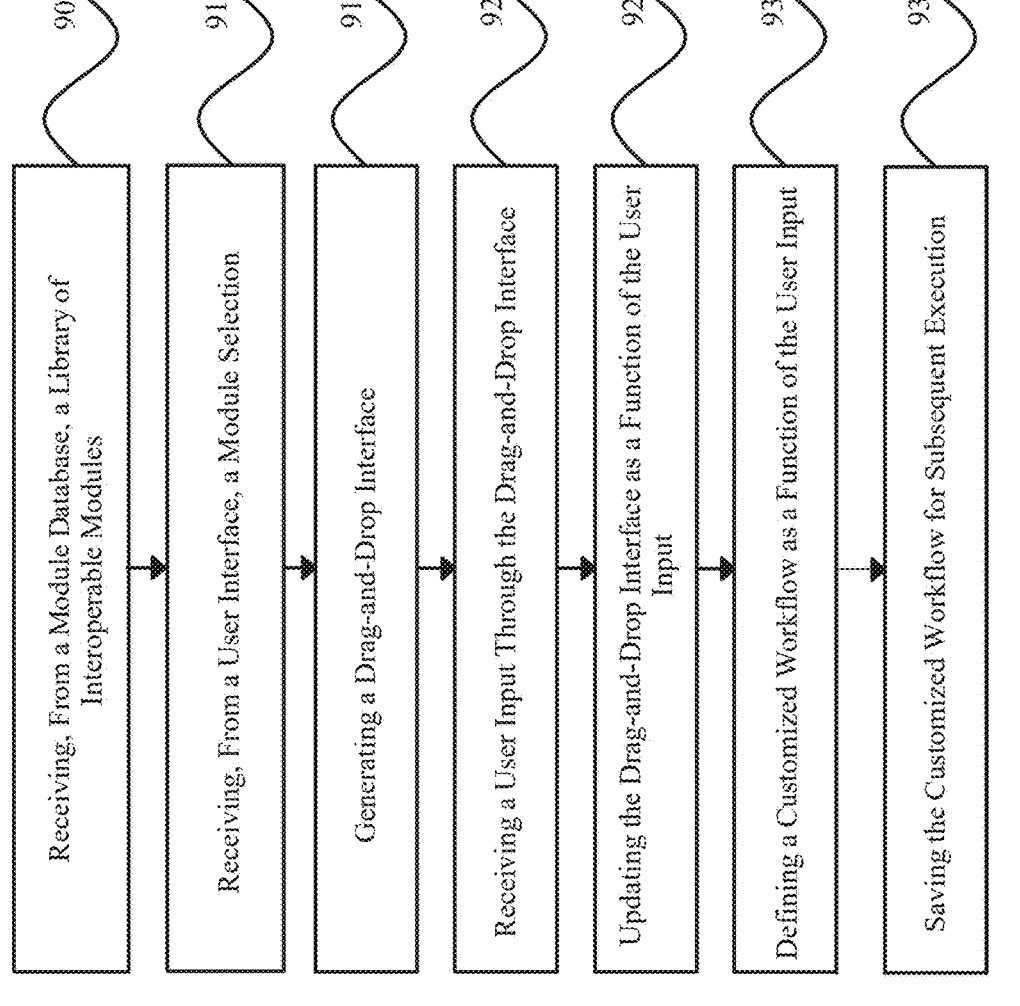

905 Receiving, From a Module Database, a Library of Interoperable Modules

910 Receiving, From a User Interface, a Module Selection

915 Generating a Drag-and-Drop Interface

920 Receiving a User Input Through the Drag-and-Drop Interface

925 Updating the Drag-and-Drop Interface as a Function of the User Input

930 Defining a Customized Workflow as a Function of the User Input

935 Saving the Customized Workflow for Subsequent Execution

MODULAR DATA ACQUISITION AND ANALYSIS SYSTEM AND METHODS THEREOF

FIELD OF THE INVENTION

The present invention generally relates to the field of optical systems and digital imaging platforms. In particular, the present invention is directed to modular data acquisition and analysis and methods thereof.

BACKGROUND

Developing workflows for optical systems and imaging platforms requires a careful balance of hardware selection, software integration, and calibration procedures to ensure accuracy and efficiency. Key challenges include aligning optical components precisely, managing data acquisition bottlenecks, and ensuring consistent image quality across different conditions. A common pitfall is neglecting proper calibration and validation steps, which can lead to measurement errors and unreliable imaging results. Additionally, failing to account for environmental factors like temperature fluctuations and vibrations can degrade system performance over time. Successful workflow development may demand rigorous testing, automation where possible, and adaptability to evolving imaging needs.

SUMMARY OF THE DISCLOSURE

In an aspect, a modular data acquisition and analysis system may include at least a processor and a memory communicatively connected to the at least a processor, wherein the memory contains instructions configuring the at least a processor to receive, from a module database, a library of interoperable modules, wherein each module of the library of interoperable modules is configured to perform at least a specific data processing task, receive, from a user interface, a module selection, wherein the module selection includes a selection of a plurality of interoperable modules of the library of interoperable modules, generate an interface, wherein the interface includes a plurality of visual elements each associated with an interchangeable module of the module selection, receive a user input through the interface, update the interface as a function of the user input, wherein updating the interface includes displaying at least a connective element as a function of the user input, wherein the at least a connective element visually connects at least a first visual element of the plurality of visual elements to at least a second visual element of the plurality of visual elements, wherein the first visual element is associated with a first module and the second visual element is associated with a second module, define a customized workflow as a function of the user input, wherein defining the customized workflow includes operatively connecting an output of the first module to an input of the second module, and save the customized workflow for subsequent execution.

In another aspect, a method for modular data acquisition and analysis may include receiving, from a module database, a library of interoperable modules, wherein each module of the library of interoperable modules is configured to perform at least a specific data processing task, receiving, from a user interface, a module selection, wherein the module selection includes a selection of a plurality of interoperable modules of the library of interoperable modules, generating an interface, wherein the interface includes a plurality of visual elements each associated with an interchangeable module of the module selection, receiving a user input through the interface, updating the interface as a function of the user input, wherein updating the interface includes displaying at least a connective element as a function of the user input, wherein the at least a connective element visually connects at least a first visual element of the plurality of visual elements to at least a second visual element of the plurality of visual elements, wherein the first visual element is associated with a first module and the second visual element is associated with a second module, defining a customized workflow as a function of the user input, wherein defining the customized workflow includes operatively connecting an output of the first module to an input of the second module, and saving the customized workflow for subsequent execution.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 9 is a flow diagram illustrating an exemplary method for modular data acquisition and analysis;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for modular data acquisition and analysis. In an embodiment, systems and methods as disclosed within may allow a user to generate and customize various workflows for optical systems and/or digital imaging platforms.

Aspects of the present disclosure can be used to provide a platform for workflow generation and customization that facilitates easy creation and access. Aspects of the present disclosure can also be used to provide a platform for third-parties to integrate their own workflow modules. This is so, at least in part, because of the open design of the system architecture that allows external developers to understand and interact with parts of the system easily.

Aspects of the present disclosure allow for modular data acquisition and analysis through customizable workflows. Exemplary embodiments illustrating aspects of the present disclosure are described below in the context of several specific examples.

Figure 1:
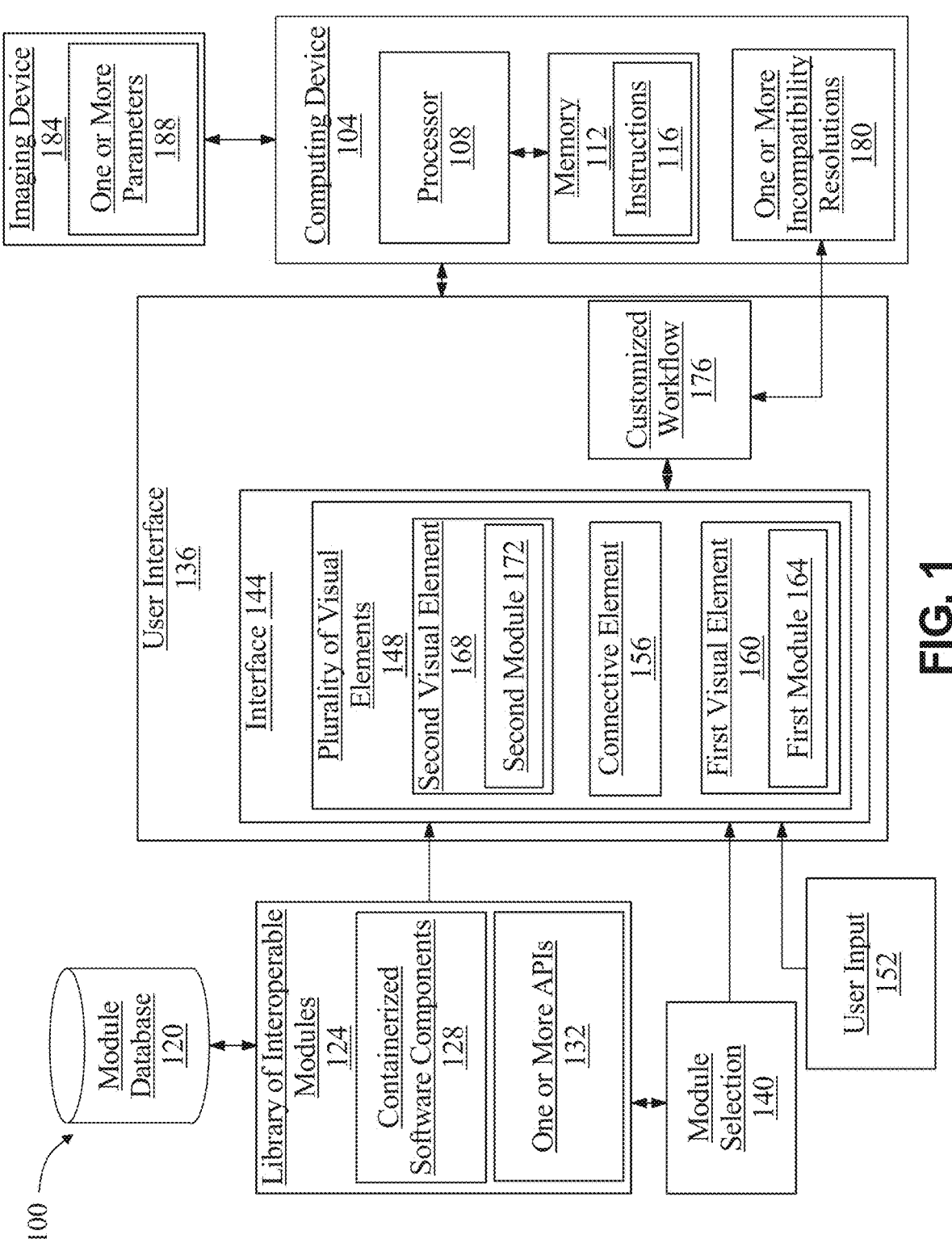
FIG. 1 is a block diagram of an exemplary system for modular data acquisition and analysis.

Referring now to FIG. 1, an exemplary embodiment of a system 100 for modular data acquisition and analysis is illustrated. System 100 may include a computing device 104. Computing device 104 includes at least a processor 108 communicatively connected to a memory 112, wherein the memory 112 contains instructions 116 configuring the at least a processor 108 to execute methods as described herein. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In further reference to FIG. 1, in an embodiment, at least a processor 108 may be configured to receive, from a module database 120, a library of interoperable modules 124. For purposes of this disclosure, a "module database" is a system or repository that stores individual modules. Modules stored at module database 120 may be independently developed, maintained, and/or integrated into larger software systems. For purposes of this disclosure, a "module" is a self-contained piece of code or functionality. In an embodiment, module database 120 may act as a central storage location for modules, which may include software components, plugins, libraries, and/or discrete pieces of functionality. Besides the code itself, module database 120 may hold metadata about each module, such as version information, dependencies, configuration details, and/or documentation.

In an embodiment, module database 120 may act as a module marketplace where third-party developers may publish and distribute their modules. By organizing modules in a database, developers may easily search for, reuse, and integrate these components into various parts of an application, promoting modular design and reducing redundancy. In one or more embodiments, module database 120 may enable dynamic loading and/or updating of modules at runtime, which may be useful in applications that need to extend and/or modify their behavior without downtime.

With continued reference to FIG. 1, at least a processor 104 may be further configured to generate a developer portal, wherein the developer portal receives user input 152 and generates a third-party module as a function of the user input 152. As used in this disclosure, a "developer portal" is a platform designed to provide entities with resources for building software modules. The developer portal may include application programming interface (API) documentation, software development kits (SDKs), sample code, tutorials, testing environments, and/or validation tools to facilitate efficient development and deployment of software components. The user input 152 may be received through text fields, dropdown menus, file uploads, code submissions, and/or interactive graphical elements. In an embodiment, the user input 152 may influence the behavior, functionality, and/or output of system 100. As used in this disclosure, a "third-party module" is a software component, developed externally from a primary system, integrated into the primary system to extend functionality, enhance interoperability, or support customization. The third-party module may be created by independent developers, external vendors, and/or open-source communities and may be accessed through APIs, SDKs, and/or plug-in architectures. Without limitation, at least a processor 104 may be configured to generate a developer portal, where users may provide user input 152, such as uploading source code, specifying dependencies, and/or configuring runtime parameters. As a function of the user input 152, the developer portal may generate a third-party module, compiling and packaging the submitted code into a deployable containerized service that can integrate seamlessly within system 100. The developer portal may also offer tools for testing and validating the third-party module, ensuring compatibility and security before deployment.

With continued reference to FIG. 1, the developer portal may include generating at least a testing environment, wherein the testing environment is configured to execute the third-party module in an isolated manner to evaluate one or more functions. As used in this disclosure, a "testing environment" is a controlled computing environment configured to execute, evaluate, and/or validate the functionality, performance, and/or security of a software module, system, and/or application before deployment. The testing environment may simulate real-world conditions, provide debugging tools, and/or enable automated and/or manual testing processes to identify errors, incompatibility, and/or performance issues. Without limitation, the testing environment may include sandboxed execution spaces, virtualized infrastructures, and/or containerized instances to facilitate safe and repeatable testing scenarios. As used in this disclosure, "functions" are specific operations performed by a software module, system, and/or application to achieve a defined objective. The one or more functions may include, without limitation, data processing, computation, input-output handling, error detection, and/or interaction with other modules. The one or more functions may be evaluated in a testing environment to verify correctness, efficiency, and/or compatibility before deployment. In an embodiment, the developer portal may test, using the at least a testing environment, the third-party module and/or the containerized module in an isolated manner to evaluate one or more functions. Without limitation, the testing environment may assess whether the third-party module correctly processes input data, adheres to expected output formats, and/or interacts seamlessly with other containerized services.

In continued reference to FIG. 1, in an embodiment, module database 120 may include a remote database. Module database 120 may be implemented, without limitation, as a relational database, a key-value retrieval database such as a NOSQL database, or any other format or structure for use as database that a person skilled in the art would recognize as suitable upon review of the entirety of this disclosure. Module database 120 may alternatively or additionally be implemented using a distributed data storage protocol and/or data structure, such as a distributed hash table or the like. Module database 120 may include a plurality of data entries and/or records as described above. Data entries in module database 120 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in module database 120 may store, retrieve, organize, and/or reflect data and/or records.

With further reference to FIG. 1, for purposes of this disclosure, a "library" is a curated collection of precompiled code, modules, or functions that can be reused across different applications or projects. In an embodiment, a library may include code segments or modules that are designed to perform common tasks or provide specific functionalities. For example, specific functionalities may include math operations, user interface 136 components, and/or network protocols. Developers may integrate these into their projects or workflows without rewriting code. In some cases, libraries may be precompiled, meaning they are built into a binary and/or packaged format that can be easily linked or imported into applications. This may improve performance and simplify integration. Further, in some embodiments, libraries may be accompanied with detailed documentation and defined interfaces, such as application programming interfaces 132 (APIs), which may explain how to use the contained modules and functions effectively.

In embodiment, module database 120 may be integrated within a cloud-based software marketplace, such as AWS Marketplace or Google Cloud Artifact Registry, where enterprises can store proprietary modules and/or distribute them to authorized users. A healthcare analytics company, for instance, may use the module repository to store AI-driven medical image processing modules, allowing hospitals to download and integrate them into their existing workflows. Without limitation, the module repository may be implemented as an internal enterprise repository, such as JFrog Artifactory or GitHub Packages, where development teams can collaboratively manage, test, and deploy reusable software components across multiple projects. In an embodiment, an organization developing microservices may use the module repository to store backend service modules to ensure consistency and reusability across different teams and environments.

Still referring to FIG. 1, for purposes of this disclosure, "interoperable" refers to the ability of different systems, modules, or components to work together, exchanging information and using each other's functionality without requiring additional adaptations. The interoperable component of the library of interoperable modules 124 contained within module database 120 may perpetuate compatibility, standardization, seamless integration, and efficiency. Compatibility refers to the ability of the components of the library of interoperable modules 124 to communicate and operate with one another, and/or independently built components, despite differences in their underlying design and/or technology. Interoperability may rely on adhering to common standards and/or protocols, ensuring that different systems can understand and correctly interpret exchanged data. The seamless integration of third-party libraries, APIs 132, and/or services into a given application without significant rework may allow for modular and scalable system design. Additionally, by ensuring interoperability, organizations may reduce development time, lower integration costs, and foster innovation through the reuse of proven, existing components.

In an embodiment, each module of the library of interoperable modules 124 may be configured to perform at least a specific data processing task. For example, each module of the library of interoperable modules 124 may be tailored to handle a particular task such as data filtering, transformation, validation, aggregation, and/or analysis, ensuring that it can operate independently. This specialization may aid in creating clear boundaries of responsibility. While each module is built for a different task, each module may be configurable, meaning it may be adjusted and/or parameterized to handle various scenarios and/or datasets within its defined role. In some cases, adjustments and/or parameterization may occur manually as a function of a user input 152. Alternatively, and/or additionally adjustments and/or parameterization may occur automatically when a first module 164 is paired with a second module 172. In an embodiment, because these modules are designed to be interoperable, they can easily be combined with other modules within the library. This may allow developers to construct complex data processing pipelines by connecting modules that perform complementary tasks without the need for significant customization. With each module focusing on a specific task, developers may reuse modules across different projects. This modular approach not only streamlines development but also enhances scalability, as individual modules may be updated and/or replaced without affecting the entire system. Further, by isolating specific data processing tasks within dedicated modules, the overall system may be more easily understood, tested, and maintained. Each module may encapsulate its internal workings, providing a clear interface for interaction with other modules.

With continued reference to FIG. 1, in an embodiment, interoperable modules may include containerized software components 128. For purposes of this disclosure, "containerized software components" refer to software components that are packaged within a container. In an embodiment, containerized software components 128 may contain an application along with its dependencies, libraries, and runtime configurations. A containerized approach may enable consistent execution across different computing environments. In an embodiment, containers may encapsulate necessary elements for an application to run, ensuring they operate independently from other software on the same system. Additionally, because everything an application requires is included within the container, these components may be easily moved between different environments without compatibility issues. In an embodiment, containerized software components 128 may be deployed, scaled, updated, and/or rolled back independently, which may enhance the flexibility and maintainability of complex systems. Further, in an embodiment, containerized software components 128 may share a host system's operating system kernel while maintaining isolated environments, making them lightweight as compared to traditional virtual machines.

With further reference to FIG. 1, in an embodiment, interoperable modules may include one or more application programming interfaces 132 (APIs) configured to facilitate communication and data exchange between system components. For example, system components may include one or more modules of the plurality of interoperable modules and/or other system components. For purposes of this disclosure, an "API" is a set of rules and protocols that enables different software components or systems to communicate with each other. In an embodiment, one or more APIs 132 may specify methods, data formats, and conventions that both communicating components must adhere to. This standardized interface may abstract the underlying complexity of the service or application, enabling developers to integrate and utilize functionality without needing to understand the internal workings. By encapsulating complex processes within simple interfaces, APIs 132 may facilitate interoperability among diverse systems, allowing them to exchange data and trigger actions seamlessly. This modular approach not only speeds up development by promoting code reuse but also enhances scalability, as individual components can be updated or replaced without disrupting the entire system. In essence, APIs 132 may enable a dynamic and interconnected ecosystem where applications can extend their capabilities by leveraging external services and functionalities.

Still referring to FIG. 1, in an embodiment, APIs 132 may be configured by first defining endpoints, which are the designated URLs representing the various services that the APIs 132 optionally offers. Optionally, each endpoint may be associated with specific HTTP methods, such as GET, POST, PUT, and DELETE, that determine how clients may interact with the respective resources. In an embodiment, the expected input and output data formats may be established using standards such as JSON or XML, and the schemas for these formats may be clearly documented. Security configurations may optionally include the implementation of authentication and authorization protocols, such as API keys, OAuth tokens, or JSON Web Tokens (JWT), to control access, as well as rate limiting to prevent potential abuse. Furthermore, middleware may be configured to manage tasks such as logging, error handling, and data validation, thereby ensuring smooth interactions between the client and server. Finally, in an embodiment, thorough testing across various environments, including development, staging, and production, may be performed to verify that the one or more APIs 132 perform as intended under diverse conditions and integrates seamlessly with other components.

In further reference to FIG. 1, in an embodiment, a virtualized bus may be utilized as an underlying communication layer that operates in conjunction with one or more APIs 132 to facilitate robust interactions between containerized modules. One or more APIs 132 may define standardized endpoints, data formats, and interaction protocols, while the virtual bus provides a scalable, transport-level mechanism for routing messages, queuing requests, and ensuring reliable delivery. In such embodiments, one or more APIs 132 may invoke operations via the virtual bus, which handles asynchronous messaging and dynamic routing between components, thereby enhancing overall system flexibility and efficiency. This combined approach may allow for clear abstraction of services through one or more APIs 132, with the virtual bus serving as the communication backbone that supports complex, distributed workflows and ensures seamless interoperability among various system modules.

In continued reference to FIG. 1, in an embodiment, each of the interoperate modules of the library of interoperable modules 124 may be instantiated by generating an extensible architecture including at least a containerized module, without limitation, as described in U.S. patent application Ser. No. 19/084,206, filed on Mar. 19, 2025, entitled "APPARATUS AND METHOD FOR GENERATING AN EXTENSIBLE ARCHITECTURE COMPRISING AT LEAST A CONTAINERIZED MODULE," which is incorporated herein by reference in its entirety.

With continued reference to FIG. 1, in an embodiment, at least a processor 108 may be configured to receive, from a user interface 136, a module selection 140. For purposes of this disclosure, a "user interface" is the point of interaction between a user and a device or application. In an embodiment, a user interface 136 (UI) may encompass the elements that allow a user to input commands and receive feedback. In some cases, the UI 136 may include visual, textual, and in some cases, auditory components that facilitate effective communication and control. In an embodiment, the UI 136 may be composed of several interconnected elements that together facilitate effective interaction between a user and a system. This may, for example, include a variety of navigation components, such as menus, toolbars, and navigation bars, which may provide clear pathways for users to access different areas of the application, often enhanced by intuitive icons and labels. These components may be designed to help users explore and efficiently locate the features or information they need. Additionally, input elements like buttons, text fields, checkboxes, radio buttons, and sliders may allow users to enter data and execute commands with ease. Further, the UI 136 may include feedback and display elements, which may include dialog boxes, notifications, status messages, and progress bars. In an embodiment, feedback display elements may ensure that users receive immediate and informative responses to their actions. In an embodiment, the UI 136 may include visual design components, such as layout, color schemes, typography, and spacing, to create a coherent and aesthetically pleasing environment that not only attracts attention but also improves usability by emphasizing key functions. Finally, in some cases the UI 136 may include interactive graphics and icons that may serve as visual cues that simplify complex interactions, making the overall experience more intuitive and accessible.

Still referring to FIG. 1, in an embodiment, UI 136 may be configured to control image processing algorithms in a graphical interface as described, without limitation, as referenced in U.S. patent application Ser. No. 18/647,138, filed on Apr. 26, 2024, entitled "APPARATUS FOR CONTROL OF IMAGE PROCESSING ALGORITHMS IN A GRAPHICAL INTERFACE," which is incorporated herein by reference in its entirety.

In further reference to FIG. 1, in an embodiment, the UI 136 may include a graphical user interface (GUI), wherein the GUI includes a plurality of visual elements 148, wherein each of the plurality of visual elements 148 includes an execution operation of the first set of execution operations and an input event handler of a plurality of input event handlers. For purposes of this disclosure a "GUI" is a visual interface that allows users to interact with electronic devices through graphical elements rather than text-based commands. Features of a GUI may include, but are not limited to windows, icons, menus, buttons, sliders and controls, and/or any other graphical content configured to assist a user in interacting with an electronic device. As used in this context, "manipulation" refers to actions or interactions a user may perform to modify, control, or navigate through an interface. Such manipulations may require the use of input devices such as, but not limited to mouses, keyboards, and/or touchscreens. For example, manipulations may include clicking, dragging, scrolling, resizing, zooming, hovering, right-clicking, keyboard shortcuts, inputting data, removing data, and/or modifying data. For purposes of this disclosure, "visual elements" refer to visual components that make up the interface and allow users to interact with a software application. These elements may be designed to provide users with an intuitive and efficient way to access the functionality of the application.

In continued reference to FIG. 1, in an embodiment, GUI may include one or more event handlers. As used throughout this disclosure, "event handler" refers to functions or methods designed to respond to specific events in a program, particularly in user interface contexts. An "event" is an occurrence that is detected by the program. For example, this may include a mouse click, keyboard input, and/or a change in a form field. In an embodiment, event handlers may include a listener and or binding process. For purposes of this disclosure, a "listener" is a function that listens for specific events on an element. For instance, a button or an input field. For purposes of this disclosure, a "binding process" is the process of associating an event with its handler. When an event occurs, an event object may be passed to the handler, containing details about the event. Event handlers may allow for interactivity, modularity, and reusability. In such that, event handlers may enable applications to respond dynamically to user actions, organize code by separating event handling logic from other program logic, and the same handler may be used for multiple elements and/or events. Further, in an embodiment, the feedback from an event handler may be utilized as training data in the training or retraining of models and/or modules as described here within.

In continued reference to FIG. 1, in an embodiment, UI 136 may be displayed at a display device, including the GUI. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a GUI to a user, wherein a user may interact with the GUI. In some cases, a user may view a GUI through display. Additionally, or alternatively, at least a processor 108 may be connected to display device.

With continued reference to FIG. 1, in an embodiment, UI 136 may be configured to display the contents generated from customized workflow 176. Such a display may align, without limitation, with embodiments as disclosed in U.S. patent application Ser. No. 18/660,007, filed on May 9, 2024, entitled "SYSTEMS AND METHODS FOR AUGMENTED VISUALIZATION USING ACTIVITY WINDOWS," which is incorporated herein by reference in its entirety.

In further reference to FIG. 1, in an embodiment, at least a processor 108 may be configured to receive a module selection 140. A module selection 140 may be input by a user at GUI and may be directly related to one or more execution operations of a task module. As used throughout this disclosure, "user input" refers to information or feedback generated by a user, in response to prompts, requests, or actions generated by the system. In an embodiment, the module selection 140 may not be limited to a single module but may include a selection of a plurality of interoperable modules of the library of interoperable modules 124. This selection may enable system 100 to perform complex, multi-step operations by integrating the functionalities of multiple modules, each contributing distinct capabilities to the overall task execution. Thus, system 100 is designed to interpret and process user input 152 that specifies which modules are to be activated or combined, ensuring that the execution operations align with the intended workflow as determined by the user.

Still referring to FIG. 1, in an embodiment, at least a processor 108 may be configured to generate an interface 144. For purposes of this disclosure, an "interface" is a point of interaction between two separate components or systems that enables them to communicate or work together. In an embodiment, interface 144 may include a drag-and-drop interface. For purposes of this disclosure, a "drag-and-drop interface" is a type of user interface that enables a user to interact with on-screen objects by clicking, dragging, and then releasing them in a new location. In an embodiment, the interface 144 may include a plurality of visual elements 148 each associated with an interchangeable module of the module selection 140. In an embodiment, the interface 144 may enable a user to directly manipulate elements, such as files, icons, graphical components, and/or modules by physically moving them from one area to another, which may simplify tasks such as organizing content and/or configuring settings. In an embodiment, the process may involve visual cues, such as highlighting or changing the appearance of potential drop targets, to guide a user and confirm valid actions. This approach may not only enhance useability by making the system more intuitive but also streamline workflows by reducing the need for complex commands or menus.

In continued reference to FIG. 1, in an embodiment, at least a processor 108 may be configured to receive a user input 152 through the interface 144. In an embodiment, when a user input 152 is received, the system may dynamically integrate multiple modules to perform complex, multi-step operations. Each selected module may contribute its unique functionality, such as data retrieval, processing, or presentation, thereby creating a composite task that exceeds the capabilities of any single module. The system may be designed to interpret user input 152 not only as a trigger for activating individual modules but also as a set of instructions that defines the order, configuration, and interdependencies among the modules. For example, one module may process raw data, while another formats the results, and a third displays the output to the user. By seamlessly combining these interoperable modules, the system may ensure that the execution operations are precisely aligned with the user's intended workflow, managing dependencies and data flows between modules to execute each step efficiently.

With further reference to FIG. 1, in an embodiment, at least a processor 108 may be configured to update the interface 144 as a function of the user input 152. In an embodiment, updating the interface 144 may include displaying at least a connective element 156 as a function of the user input 152. For purposes of this disclosure, a "connective element" is a component or mechanism that visually and functionally links two or more elements to one another. In an embodiment, the at least a connective element 156 may visually connect at least a first visual element 160 of the plurality of visual elements 148 to at least a second visual element 168 of the plurality of visual elements 148. In an embodiment, the first visual element 160 may be associated with a first module 164 and the second visual element 168 may be associated with a second module 172. Specifically, as a user interacts with the interface 144, such as dragging a visual representation of a module, at least a processor 108 may respond by showing a connective element 156 that establishes a clear, visual link between the active element and a potential target element. For example, the connective element 156 may appear as a line, arrow, or highlighted area that visually connects a first visual element 160, associated with a first module 164, to a second visual element 168, associated with a second module 172. This visual connection not only guides the user in making appropriate module selections but may also signify that the selected modules are compatible for integration. By updating the interface in response to user input 152, at least a processor 108 may ensure that the functional relationships between modules are clearly communicated, thereby enhancing the overall usability and effectiveness of the interface 144.

With continued reference to FIG. 1, in an embodiment, in cases where a first module 164 and a second module 172 may not be fully compatible, at least a processor 108 may be configured to update at least an operational parameter of the first module 164 and the second module 172 as a function of the user input 152. For purposes of this disclosure, an "operational parameter" refers to a value or setting that governs the behavior or performance of a module within a larger system or workflow. In an embodiment, operational parameters may define specific aspects of module performance, such as, and without limitation, processing limits, data exchange formats, timing constraints, or resource allocations, and ensures that each module functions within predetermined parameters. By standardizing these operational parameters, at least a processor 108 may promote interoperability, allowing modules to communicate and integrate seamlessly while adapting to dynamic operational requirements. Operational parameters can be adjusted to optimize performance, maintain consistency across diverse modules, and enable scalable and flexible system configurations.

In further reference to FIG. 1, in an embodiment, updating at least an operational parameter of the first module 164 and the second module 172 may, in some cases, include receiving a user input 152. In an embodiment, the user input 152 may include one or more selections of parameters and options that define at least an operational parameter of the first module 164 and the second module 172. For example, the user input 152 may include parameter options related to processing capabilities, resource allocation, or communication settings, which are then applied to adjust how each module performs its functions. The configurable operational parameters may serve as guidelines that ensure each module adheres to predetermined performance and interoperability criteria.

Continuing to reference FIG. 1, in an embodiment, user selections for operational parameters may include a variety of configurable settings that directly influence the performance and interoperability of individual modules. For example, users may be provided with options to adjust resource allocation parameters such as CPU usage limits, memory thresholds, or network bandwidth settings, which can tailor the module's performance to specific operational needs. Additionally, users may select parameters related to timing constraints, such as execution intervals or response time limits, to ensure that modules operate within desired performance windows. Other well-suited selections could include communication protocol preferences, security settings like encryption levels or authentication methods, and logging or debugging levels that affect how detailed the module's operational data is recorded. By offering these selections, at least a processor 108 may enable users to fine-tune the operational parameters, ensuring that each module functions optimally both independently and in concert with other modules within the ecosystem.

In further reference to FIG. 1, in an embodiment, the one or more selections of parameters and options that define at least an operational parameter of the first module 164 and the second module 172 may be visually displayed at UI 136. In an embodiment, the visual display may include interactive elements such as drop-down menus, which may allow the user to easily review and select from a list of available parameter options. The drop-down menu may serve as an intuitive mechanism for presenting various settings in a concise format that is both accessible and efficient. By selecting options from the drop-down menu, the user can directly influence the operational parameters, ensuring that each module functions in accordance with the desired configuration. Such an embodiment may enhance usability by simplifying the parameter selection process and ensure that any adjustments made by the user are immediately reflected in the system's operational behavior, thereby promoting consistent and optimized module performance.

Alternatively, and/or additionally, updating at least an operational parameter may be a function of at least a processor 108, wherein updating the at least an operational parameter is automatic as a function of connecting a first module 164 to a second module 172. In an embodiment, at least a processor 108 may detect the interconnection of one or more modules and initiate an automatic process to adjust the relevant operational parameters, thereby ensuring that the connected modules operate in harmony. For example, upon establishing the connection, at least a processor 108 may analyze requirements, capabilities, and communication protocols of both modules and then automatically modify settings such as timing, resource allocation, or data exchange formats to optimize performance. This automatic updating may minimize the need for manual intervention by the user, streamlining system configuration and reducing potential errors. Additionally, the real-time adjustment of these parameters as a function of the module connection may further enhance system responsiveness and adaptability, ensuring that the integrated modules perform their tasks with consistent efficiency and interoperability.

In an embodiment, updating at least an operational parameter may further include setting an input and an output specification for each module as a function of the at least an operational parameter. For purposes of this disclosure, "input specification" is the definition of what data each module may receive. Alternatively, "output specification" is the data that a module produces. This means that when at least an operational parameter is updated, at least a processor

108 may adjust the definitions of what data each module can receive and what data it produces. For example, if an operational parameter indicates a change in processing capacity, at least a processor 108 may automatically modify the buffer sizes or data types expected at the module's input, ensuring that incoming data is compatible with the module's current operating state. Similarly, the output specification is updated so that the data produced by the module conforms to the new operational context, allowing seamless downstream processing by interconnected modules. This dynamic configuration may help maintain interoperability between modules, as the input and output specifications are continuously aligned with the operational parameters, thereby enhancing system performance and reducing the likelihood of data mismatches or errors during inter-module communication.

In an embodiment, updating at least an operational parameter may further include defining at least a processing criterion for each module as a function of the at least an operational parameter. For purposes of this disclosure, "processing criteria" is a defined set of rules, conditions, or thresholds that determine how a module processes data or executes tasks. In an embodiment, at least a processing criterion may serve as a guideline for decision-making within the module, specifying what conditions must be met for certain processing actions to occur. For instance, a processing criterion might dictate that only data values exceeding a certain threshold are processed further, or it could establish a sequence of operations to be followed when specific inputs are received. By defining these criteria, the system ensures that each module operates consistently and efficiently in accordance with its configured operational parameters, thus maintaining optimal performance and interoperability within the broader system. In an embodiment, linking the processing criterion directly to the operational parameters may ensure that any change in a module's operational state is automatically reflected in its processing behavior.

In an embodiment, updating at least an operational parameter may further include establishing one or more execution conditions that govern the operation of each module within the customized workflow 176. For purposes of this disclosure, a "workflow" is a defined sequence of tasks and activities designed to achieve a specific outcome. Whereas a "customized workflow," as used throughout this disclosure, is a tailored process designed to meet specific requirements by selecting and linking individual modules from a suite of options. For purposes of this disclosure, "execution conditions" refer to the predefined set of prerequisites or criteria that must be met before a module or component within a workflow can initiate its processing tasks. In an embodiment, execution conditions may include requirements such as the successful receipt of input data, the completion of previous processing steps, specific system state validations, or adherence to timing and synchronization constraints. For example, the execution conditions may specify that a module only begins processing once it receives a minimum volume of data, or that it must await confirmation of successful execution from a preceding module. Such conditions could also include timing constraints or synchronization signals to ensure that the workflow proceeds in an orderly and efficient manner. By establishing these execution conditions, at least a processor 108 may ensure that each module begins its operation only when all necessary dependencies are satisfied, thereby maintaining orderly processing, preventing errors, and optimizing overall workflow efficiency.

In an embodiment, updating at least an operational parameter may further include applying the at least an operational parameter to the first module 164 and the second module 172 to configure their operation within the customized workflow 176. In an embodiment, this may entail integrating the updated parameter into the modules' configuration settings, ensuring that both modules adjust their internal behaviors to align with the desired workflow. For example, if the operational parameter specifies a new threshold for processing speed or a modified data exchange format, both modules may update their settings accordingly to maintain synchrony and interoperability. This dynamic adjustment may facilitate a cohesive operational environment, enabling each module to function optimally while contributing to the overall efficiency and effectiveness of the workflow.

Continuing to reference FIG. 1, in an embodiment, at least a processor 108 may be configured to define a customized workflow 176 as a function of the user input 152. This process may involve interpreting the user's selections or configurations to determine how various modules should interact within the overall workflow. For instance, defining the customized workflow 176 may include operatively connecting an output of the first module 164 to an input of the second module 172, establishing a direct data flow or command pathway between them. This connection may ensure that the data processed by the first module 164 is immediately available to the second module 172 for further processing, analysis, or presentation. Such operable linking not only promotes seamless interoperability between modules but may also facilitate the creation of complex, multi-step processes that can adapt dynamically as the user's needs evolve. Ultimately, this embodiment enables a highly responsive system architecture where user input 152 directly influences the functional integration and operational efficiency of the interconnected modules.

With continued reference to FIG. 1, in an embodiment, at least a processor 108 may be configured to validate a compatibility of the first module 164 and the second module 172. For purposes of this disclosure, "compatibility" refers to the ability of different modules or system components to operate together seamlessly without conflicts. In an embodiment, validating the compatibility of the first module 164 and the second module 172 may include comparing an output type of the first module 164 to an input type of the second module 172. This comparison may entail examining the data format, structure, and protocol specifications associated with the output and input, respectively, to ensure that the information produced by the first module 164 is fully comprehensible and processable by the second module 172. Additionally, at least a processor 108 may assess other parameters, such as timing constraints, communication protocols, or operational settings, that further contribute to overall compatibility. If the output type aligns with the input type and all related criteria are satisfied, the modules may be deemed compatible, allowing them to be operatively connected within the customized workflow 176. Conversely, if discrepancies are identified, at least a processor 108 may trigger corrective actions, such as prompting the user for parameter adjustments or initiating automated remediation steps to resolve the incompatibility.

In continued reference to FIG. 1, in an embodiment, at least a processor 108 may be configured to suggest one or more incompatibility resolutions 180 as a function of validating the compatibility of the first module 164 and the second module 172. For purposes of this disclosure, incompatibility resolutions" refer to the various methods, processes, and strategies employed to address and mitigate conflicts or mismatches between modules or system components that hinder their seamless integration and operation. Suggesting one or more incompatibility resolutions 180 may, in some cases, include determining at least one resolution strategy as a function of an identified incompatibility. For instance, if the output of the first module 164 does not directly match the input requirements of the second module 172, at least a processor 108 may determine that a data conversion, parameter adjustment, or protocol modification is necessary. In response, at least a processor 108 may suggest one or more incompatibility resolutions 180 tailored to the specific incompatibility identified. This process may include automatically selecting a resolution from a predefined set of strategies and/or prompting the user with potential options for manual intervention. By linking the identification of an incompatibility to a corresponding resolution strategy, at least a processor 108 may ensure that any detected issue may be effectively addressed, thereby maintaining the overall integrity and efficiency of the customized workflow 176.

In an embodiment, validating the compatibility of the first module 164 and the second module 172 may further include providing to a user, using the user interface, one or more incompatibility resolutions 180. These suggested resolutions may include recommended changes to module configurations, such as adjusting parameters or modifying data formats, to better align the output of one module with the input requirements of the other. Alternatively, and/or additionally, at least a processor 108 may propose selecting an alternative module that is inherently more compatible with the current configuration or recommend middleware integration options that function as intermediary components to bridge any discrepancies between the modules. By presenting these options through the user interface, at least a processor 108 may empower the user to review and select the most appropriate resolution strategy, thereby facilitating a smoother, more interoperable workflow.

In an embodiment, validating the compatibility of the first module 164 and the second module 172 may further include facilitating the implementation of a selection incompatibility resolution by updating at least an operational parameter of the first module 164 and the second module 172 to restore compatibility. This process may involve at least a processor 108 identifying specific parameters, such as data format specifications, communication protocols, or resource allocations, that require adjustment to reconcile any discrepancies between the modules. Once these parameters are updated, the modules may be reconfigured so that the output of the first module 164 aligns with the input of the second module 172, thereby reestablishing a seamless integration. This implementation may be triggered by user selection or initiated automatically by the system based on predefined heuristics. As a result, the customized workflow 176 may be restored to optimal functionality, ensuring that the modules operate in concert without conflict, while maintaining overall system performance and interoperability.

In further reference to FIG. 1, in an embodiment, at least a processor 108 may be configured to save the customized workflow 176 for subsequent execution. In an embodiment, the customized workflow 176 may be stored locally and/or remotely. In some cases, this may include cloud storage. This flexibility in storage options may ensure that workflows can be securely archived and accessed from various environments, thereby enhancing system scalability and user convenience. Additionally, at least a processor 108 may incorporate optimization processing on these saved workflows. In such embodiments, after a workflow is saved, it may be analyzed using optimization algorithms that assess performance metrics, such as execution time, resource utilization, and throughput, to determine efficiency. Based on this analysis, at least a processor 108 may generate an optimization score and/or detailed report, which may be provided to the user via the user interface. This report may outline recommended changes and/or enhancements that could further optimize the workflow, thereby enabling continuous improvement in system performance and interoperability.

With continued reference to FIG. 1, in an embodiment, at least a processor 108 may be configured to execute a saved custom workflow as a function of a detected prompt. For purposes of this disclosure, a "prompt" refers to a specific trigger or condition that signals at least a processor 108 to initiate a particular action. In an embodiment, a prompt may include an event, an input, and/or a detected change in state. For example, a prompt may include any pre-defined condition or event that the system continuously monitors. As an example, the saved customized workflow 176 could be triggered by detecting label information, such as a barcode scan or RFID tag read, which may then prompt at least a processor 108 to execute a related set of operations such as specific processing workflows. By automatically executing workflows upon detecting these prompts, the system may streamline operations, reduce the need for manual intervention, and ensure timely responses to dynamic events within the environment.

With continued reference to FIG. 1, in an embodiment, system 100 may further include an imaging device 184. For purposes of this disclosure, an "imaging device" is an apparatus designed to capture, process, and output visual information. In some cases, an imaging device 184 may incorporate various components, such as sensors, lenses, and/or image processors to record still images or video. In an embodiment, imaging device 184 may be implemented as a standalone unit, such as a digital camera or scanner, or integrated into a larger system, such as a mobile device or industrial machine. In an embodiment, the imaging device 184 may be communicatively connected to at least a processor 108.

Still referring to FIG. 1, in some embodiments, imaging device 184 may be used to generate an image of slide and/or a sample on slide. As used herein, a "slide" is a container or surface holding a sample of interest. In some embodiments, slide may include a glass slide. In some embodiments, slide may include a formalin fixed paraffin embedded slide. In some embodiments, a sample on slide may be stained. In some embodiments, slide may be substantially transparent. In some embodiments, slide may include a thin, flat, and substantially transparent glass slide. In some embodiments, a transparent cover may be applied to slide such that a sample is between slide and this cover. A sample may include, in non-limiting examples, a blood smear, pap smear, body fluids, and non-biologic samples. In some embodiments, a sample on slide may include tissue. In some embodiments, sample on slide may be frozen.

Still referring to FIG. 1, in some embodiments, slide and/or a sample on slide may be illuminated. In some embodiments, imaging device 184 may include a light source. As used herein, a "light source" is any device configured to emit electromagnetic radiation. In some embodiments, light source may emit a light having substantially one wavelength. In some embodiments, light source may emit a light having a wavelength range. Light source may emit, without limitation, ultraviolet light, visible light, and/or infrared light. In non-limiting examples, light source may include a light-emitting diode (LED), an organic LED (OLED) and/or any other light emitter. Such a light source may be configured to illuminate slide and/or sample on slide. In a non-limiting example, light source may illuminate slide and/or sample on slide from below.

Still referring to FIG. 1, in some embodiments, imaging device 184 may include at least an optical system. As used in this disclosure, an "optical system" is an arrangement of one or more components which together act upon or employ electromagnetic radiation. In non-limiting examples, electromagnetic radiation may include light, such as visible light, infrared light, UV light, and the like. An optical system may include one or more optical elements, including without limitation lenses, mirrors, windows, filters, and the like. An optical system may form an optical image that corresponds to an optical object. For instance, an optical system may form an optical image at or upon an optical sensor, which can capture, e.g., digitize, the optical image. In some cases, optical system may have at least a magnification. For instance, optical system may include an objective (e.g., microscope objective) and one or more reimaging optical elements that together produce an optical magnification. In some cases, optical magnification may be referred to herein as zoom. As used herein, an "optical sensor" is a device that measures light and converts the measured light into one or more signals; one or more signals may include, without limitation, one or more electrical signals. In some embodiments, optical sensor may include at least a photodetector. As used herein, a "photodetector" is a device that is sensitive to light and thereby able to detect light. In some embodiments, a photodetector may include a photodiode, a photoresistor, a photosensor, a photovoltaic chip, and the like. In some embodiments, optical sensor may include a plurality of photodetectors. Optical sensor may include, without limitation, a camera. Optical sensor may be in electronic communication with at least a processor 108 of system 100. As used herein, "electronic communication" as used in this disclosure is a shared data connection between two or more devices. In some embodiments, imaging device 184 may include two or more optical sensors. In some embodiments, a scanner may include at least an optical system.

Still referring to FIG. 1, in some embodiments, optical system may include a camera. In some cases, a camera may include one or more optics. Exemplary non-limiting optics include spherical lenses, aspherical lenses, reflectors, polarizers, filters, windows, aperture stops, and the like. In some embodiments, one or more optics associated with a camera may be adjusted in order to, in non-limiting examples, change the zoom, depth of field, and/or focus distance of the camera. In some embodiments, one or more of such settings may be configured to detect a feature of a sample on slide. In some embodiments, one or more of such settings may be configured based on a scanning parameter, as described herein. In some embodiments, camera may capture images at a low depth of field. In a non-limiting example, camera may capture images such that a first depth of sample is in focus and a second depth of sample is out of focus. In some embodiments, an autofocus mechanism may be used to determine focus distance. In some embodiments, focus distance may be set by parameter set. In some embodiments, camera may be configured to capture a plurality of images at different focus distances. In a non-limiting example, camera may capture a plurality of images at different focus distances, such that images are captured where each focus depth of the sample is in focus in at least one image. In some embodiments, at least a camera may include an image sensor. Exemplary non-limiting image sensors include digital image sensors, such as without limitation charge-coupled device (CCD) sensors and complimentary metal-oxide-semiconductor (CMOS) sensors. In some embodiments, a camera may be sensitive within a non-visible range of electromagnetic radiation, such as without limitation infrared.

Still referring to FIG. 1, as used herein, "image data" is information representing at least a physical scene, space, and/or object. Image data may include, for example, information representing a sample, slide, or region of a sample or slide. In some cases, image data may be generated by a camera. "Image data" may be used interchangeably through this disclosure with "image," where image is used as a noun. An image may be optical, such as without limitation where at least an optic is used to generate an image of an object. An image may be digital, such as without limitation when represented as a bitmap. Alternatively, an image may include any media capable of representing a physical scene, space, and/or object. Alternatively, where "image" is used as a verb, in this disclosure, it refers to generation and/or formation of an image.

Still referring to FIG. 1, in some embodiments, imaging device 184 may include a slide port. In some embodiments, slide port may be configured to hold slide. In some embodiments, slide port may include one or more alignment features. As used herein, an "alignment feature" is a physical feature that helps to secure a slide in place and/or align a slide with another component of an apparatus. In some embodiments, alignment feature may include a component which keeps slide secure, such as a clamp, latch, clip, recessed area, or another fastener. In some embodiments, slide port may allow for easy removal or insertion of slide. In some embodiments, slide port may include a transparent surface through which light may travel. In some embodiments, slide may rest on and/or may be illuminated by light traveling through such a transparent surface. In some embodiments, slide port may be mechanically connected to an actuator mechanism as described below. In some embodiments, a scanner may include a slide port.

Still referring to FIG. 1, in some embodiments, imaging device 184 may include an actuator mechanism. As used herein, an "actuator mechanism" is a mechanical component configured to change the relative position of a slide and an optical system. In some embodiments, actuator mechanism may be mechanically connected to slide, such as slide in slide port. In some embodiments, actuator mechanism may be mechanically connected to slide port. For example, actuator mechanism may move slide port in order to move slide. In some embodiments, actuator mechanism may be mechanically connected to at least an optical system. In some embodiments, actuator mechanism may be mechanically connected to a mobile element. A mobile element may include a movable or portable object, component, and/or device within imaging device 184 such as, without limitation, a slide, a slide port, or an optical system. In some embodiments, a mobile element may move such that optical system is positioned correctly with respect to slide such that optical system may capture an image of slide according to a scanning parameter. In some embodiments, actuator mechanism may be mechanically connected to an item selected from the list consisting of slide port, slide, and at least an optical system. In some embodiments, actuator mechanism may be configured to change the relative position of slide and optical system by moving slide port, slide, and/or optical system. In some embodiments, a scanner may include an actuator mechanism.

Still referring to FIG. 1, actuator mechanism may include a component of a machine that is responsible for moving and/or controlling a mechanism or system. Actuator mechanism may, in some embodiments, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some embodiments, upon receiving a control signal, actuator mechanism responds by converting source power into mechanical motion. In some cases, actuator mechanism may be understood as a form of automation or automatic control.

Still referring to FIG. 1, in some embodiments, actuator mechanism may include a hydraulic actuator. A hydraulic actuator may consist of a cylinder or fluid motor that uses hydraulic power to facilitate mechanical operation. Output of hydraulic actuator mechanism may include mechanical motion, such as without limitation linear, rotatory, or oscillatory motion. In some embodiments, hydraulic actuator may employ a liquid hydraulic fluid. As liquids, in some cases, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

Still referring to FIG. 1, in some embodiments, actuator mechanism may include a pneumatic actuator mechanism. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

Still referring to FIG. 1, in some cases, actuator mechanism may include an electric actuator. Electric actuator mechanism may include any of electromechanical actuators, linear motors, and the like. In some cases, actuator mechanism may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. Electric actuator mechanism may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may be directly controlled by a control signal for controlling one or more linear motor parameters. Exemplary linear motor parameters include without limitation position, force, velocity, potential, and current.

Still referring to FIG. 1, in some embodiments, an actuator mechanism may include a mechanical actuator mechanism. In some cases, a mechanical actuator mechanism may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanisms, including, for example, gears, rails, pulleys, cables, linkages, and the like.

Still referring to FIG. 1, in some embodiments, actuator mechanism may be in electronic communication with actuator controls. As used herein, "actuator controls" is a system configured to operate actuator mechanism such that a slide and an optical system reach a desired relative position. In some embodiments, actuator controls may operate actuator mechanism based on input received from a user interface. In some embodiments, actuator controls may be configured to operate actuator mechanism such that optical system is in a position to capture an image of an entire sample. In some embodiments, actuator controls may be configured to operate actuator mechanism such that optical system is in a position to capture an image using settings of a particular scanning parameter. In some embodiments, actuator controls may be configured to operate actuator mechanism such that optical system is in a position to capture an image of a region of interest, a particular horizontal row, a particular point, a particular focus depth, and the like. Electronic communication between actuator mechanism and actuator controls may include transmission of signals. For example, actuator controls may generate physical movements of actuator mechanism in response to an input signal. In some embodiments, input signal may be received by actuator controls from processor or input interface.

In further reference to FIG. 1, in an embodiment, at least a processor 108 may be further configured to adjust one or more parameters 188 of the imaging device 184 as a function of an output of the customized workflow 176. This adjustment process may involve analyzing the workflow's output, such as environmental conditions, image quality metrics, or specific data requirements, and then determining the optimal settings for the imaging device 184. For example, if the output indicates that the captured images are underexposed, the processor might automatically adjust the imaging device's 184 exposure, shutter speed, or sensor gain to enhance image brightness. Alternatively, if the workflow output suggests a need for higher resolution or improved focus for detailed analysis, the processor may modify parameters such as resolution settings, focus calibration, or white balance. These dynamic adjustments may ensure that the imaging device 184 operates at optimal performance levels for varying conditions or specific applications, thereby enhancing the overall quality and utility of the captured visual data. The adjustments can be made automatically or provided as recommendations to the user for further refinement, thereby integrating adaptive system behavior into the imaging process. The adjustment of one or more parameters 188 may align, without limitation, embodiments as referenced in U.S. patent application Ser. No. 18/602,947, filed on Mar. 12, 2024, entitled "SYSTEMS AND METHODS FOR INLINE QUALITY CONTROL OF SLIDE DIGITIZATION," which is incorporated herein by reference in its entirety. Still referring to FIG. 1, in an embodiment, at least a processor 108 may be configured to manage a custom workflow execution. This management function may involve scheduling tasks, allocating resources, and ensuring that each module within the workflow receives the appropriate inputs and delivers its output in a timely manner. At least a processor 108 may monitor the progress of the workflow in real-time, handling any errors or exceptions that may arise, and dynamically adjusting operational parameters as needed to maintain optimal performance and stability. Additionally, at least a processor 108 may coordinate data exchanges between modules, manage dependencies, and synchronize operations across both local and remote storage systems to ensure that intermediate results and final outputs are accurately stored and readily accessible. Through these integrated functions, at least a processor 108 may facilitate a seamless, efficient, and reliable execution of complex, customized workflows 176.

In an embodiment, managing a custom workflow may include interpreting the customized workflow 176. In an embodiment, interpreting the custom workflow may include parsing a workflow definition file to extract module dependencies, execution order, and resource requirements, generating a representative data structure as a function of parsing the workflow definition file, and determining an optimized execution strategy as a function of the representative data structure. This interpretation process may begin by parsing a workflow definition file, which contains detailed descriptions of the various modules, their dependencies, execution order, and resource requirements. For purposes of this disclosure, a "workflow definition file" is a structured blueprint that outlines an automated process. By systematically reading and analyzing this file, at least a processor 108 may extract critical information that delineates how each module interacts with others, the sequence in which tasks should be executed, and what system resources are necessary for successful operation. Once the workflow definition file is parsed, at least a processor 108 may generate a representative data structure that encapsulates this extracted information. This data structure may take the form of a directed graph or another structured format where nodes represent individual modules and edges indicate dependencies or data flows between them. The data structure may serve as a comprehensive model of the workflow, allowing the processor to clearly visualize the relationships and constraints among the modules. With this representative data structure in place, at least a processor 108 may determine an optimized execution strategy. This strategy may involve analyzing the workflow's structure to identify opportunities for parallel processing, load balancing, and efficient resource allocation. By leveraging insights from the data structure, at least a processor 108 can sequence module executions in a way that minimizes latency, reduces resource contention, and adapts to dynamic system conditions. Ultimately, this approach may ensure that the custom workflow is executed in the most efficient and reliable manner possible, aligning with both the system's capabilities and the user's performance objectives.

With continued reference to FIG. 1, in an embodiment, at least a processor 108 may instantiate a machine-learning model configured to interpret the customized workflow 176. In such an embodiment the machine-learning model may enhance both the extraction of critical workflow parameters and the subsequent generation of an optimized execution strategy. The machine-learning model may be trained on historical workflow definitions, execution logs, and performance metrics to identify patterns in module dependencies, execution order, and resource requirements. As at least a processor 108 parses a workflow definition file, the machine-learning model may assist by automatically extracting key parameters and constructing a representative data structure that accurately reflects the underlying architecture of the workflow. This data structure may benefit from the machine-learning model's ability to recognize and learn from past workflows, thereby detecting subtle interdependencies or potential bottlenecks that might be overlooked through manual parsing alone.

In further reference to FIG. 1, in an embodiment, the machine-learning model may contribute significantly to determining an optimized execution strategy. By simulating various execution sequences and resource allocation scenarios, the machine-learning model may predict the impact of different strategies on overall system performance. This prediction capability May enable the machine-learning model to recommend the most efficient execution path. The machine-learning model may continuously refine its recommendations by incorporating real-time performance data and feedback from previous executions, ensuring that the workflow is not only correctly interpreted but also executed in a manner that maximizes efficiency and scalability. Through these contributions, the integration of machine-learning into the interpretation process facilitates a more adaptive, automated, and intelligent approach to managing complex, customized workflows 176.

With continued reference to FIG. 1, in an embodiment, managing a custom workflow may include executing the customized workflow 176. The execution process may begin with at least a processor 108 assigning each module an execution state based on the workflow dependencies identified during interpretation. Such an assignment may ensure that each module is aware of its position in the execution sequence, distinguishing between those that must be executed sequentially and those that can be executed concurrently. For example, modules that depend on the output of preceding tasks may be queued in a sequential manner, while independent or parallelizable tasks may be scheduled for concurrent execution, thereby optimizing resource utilization and minimizing overall latency. Once execution states are assigned and the workflow dependencies are resolved, at least a processor 108 may proceed to queue the modules for execution. In this phase, sequential tasks may be carefully scheduled in an order required by the workflow, ensuring that each module receives the necessary input data generated by its predecessor. Simultaneously, modules that do not depend on the completion of others may be executed concurrently, taking full advantage of available processing resources. The final step in the execution process may involve at least a processor 108 invoking each module by transmitting execution commands and the appropriate input data to the corresponding module. This invocation may initiate the module's processing function, with the execution state and dependency information ensuring that every module operates within the defined parameters of the customized workflow 176. Collectively, these processes may enable at least a processor 108 to execute complex workflows in a dynamic, efficient, and coordinated manner.

In further reference to FIG. 1, in an embodiment, managing a custom workflow execution may further include handling error conditions. For purposes of this disclosure, "error conditions" refer to specific states or events that indicate a deviation from expected or normal operations within a module or system. In an embodiment, error conditions may arise from a variety of sources, such as unexpected input, configuration issues, resource constraints, and/ or unforeseen runtime exceptions. When an error condition is detected, it may signal that a module or process is not functioning as intended, which may require corrective measures, such as automated retries, logging for diagnostics, and/or user intervention. In an embodiment, handling error conditions may include detecting one or more errors as a function of monitoring execution progress, identifying one or more failure causes, wherein the failure causes include one or more of: missing dependencies, timeout events, and/or resource exhaustion, and triggering a predefined resolution mechanism. Detecting one or more errors may begin with continuously monitoring the execution progress of the workflow, where the system detects deviations or anomalies that indicate one or more errors. Once an error is detected, at least a processor 108 may proceed to identify the underlying failure causes by analyzing logs, status indicators, and performance metrics. This identification phase may help pinpoint whether the error is due to a missing dependency, a timeout, resource constraints, or a combination of these issues. Following the identification of the failure causes, at least a processor 108 may then trigger a predefined resolution mechanism tailored to address the specific error condition. This resolution mechanism may include automated corrective actions, such as reallocating resources, reinitializing failed modules, or dynamically reconfiguring module dependencies, or, in some cases, it might involve alerting the user to manually intervene. By integrating these at least a processor 108 may ensure that any disruptions are swiftly managed, thereby maintaining the integrity and efficiency of the overall workflow execution.

Figure 2:
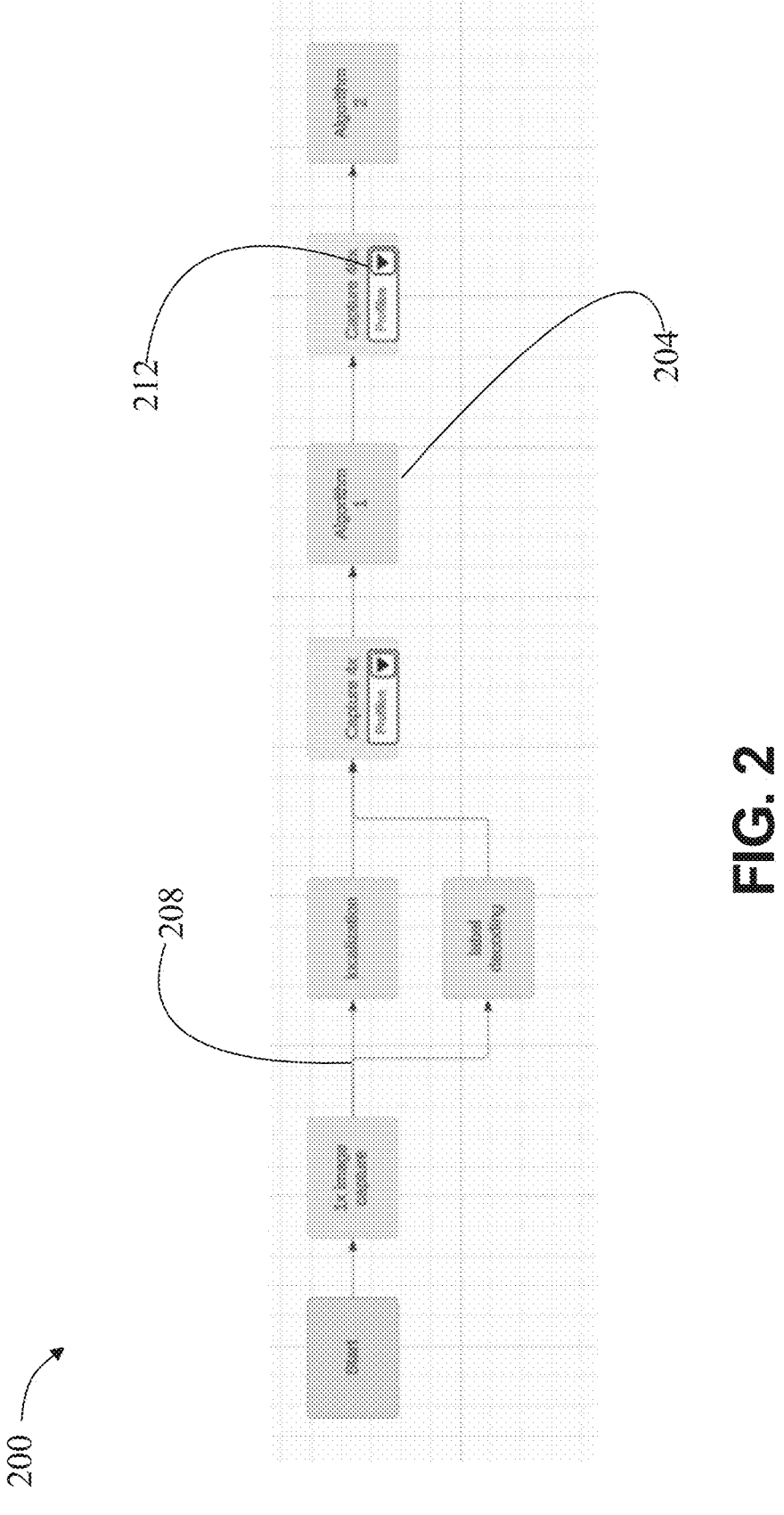
FIG. 2 illustrates an exemplary customized workflow.

Referring now to FIG. 2, illustrated is an exemplary customized workflow 200. In an embodiment, customized workflow 200 may include a plurality of interoperable modules 204 connected by way of a connective element 208. In an embodiment, customized workflow 200 may include tasks that run sequentially, which is indicated by the plurality of interoperable modules 204 on a first level. Alternatively, and/or additionally, customized workflow 200 may include tasks that may be run in parallel, which is indicated by the plurality of interoperable modules 204 on a first level and at least one interoperable module of the plurality of interoperable modules 204 on a second level. One or more operational parameters 212 may be selected from a dropdown menu where applicable.

Figure 3:
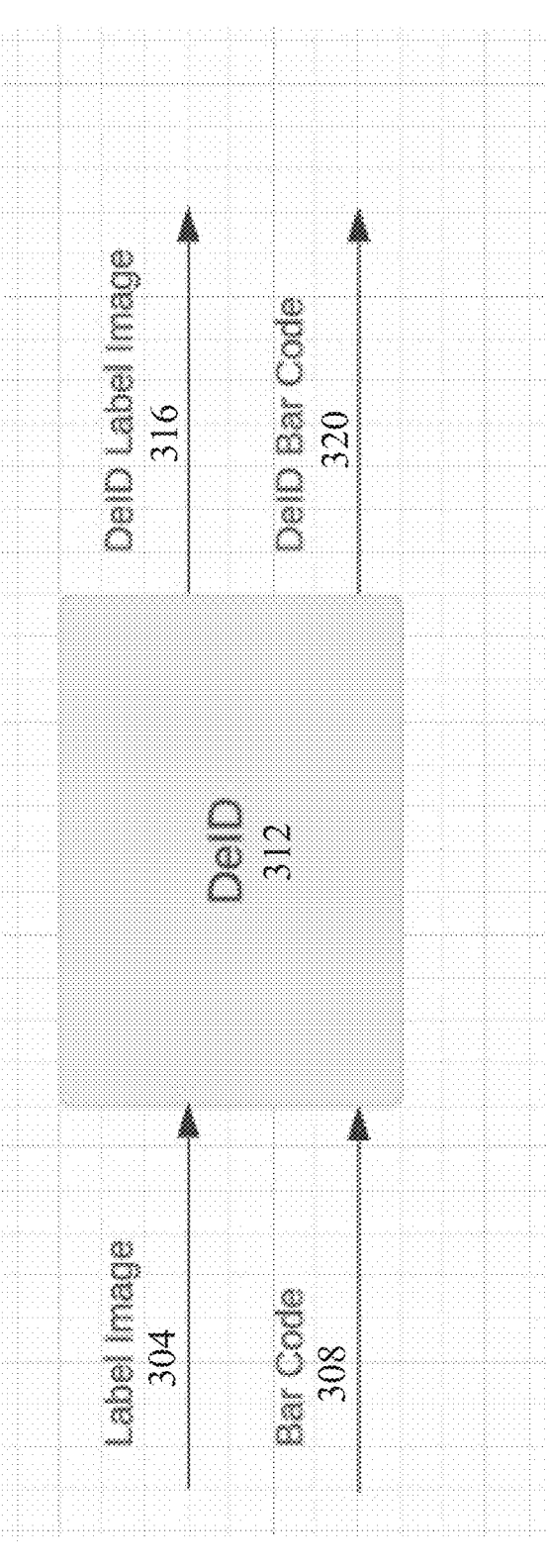
FIG. 3 is an exemplary illustration of at least a containerized module comprising an obfuscation task.

Referring now to FIG. 3, an exemplary illustration of at least a containerized module 300 comprising an obfuscation task. In an embodiment, the at least a containerized module 300 includes a label image 304 as input. In an embodiment, the at least a containerized module 300 includes a bar code 308 as input. In an embodiment, the at least a containerized module 300 includes a de-identified model 312. In an embodiment, the de-identified model 312 receives the label image 304 and/or the bar code 308. In an embodiment, the de-identified model 312 generates output, wherein the output includes de-identified label image 316. In an embodiment, the de-identified model 312 generates output, wherein the output includes de-identified bar code 320.

Figure 4:
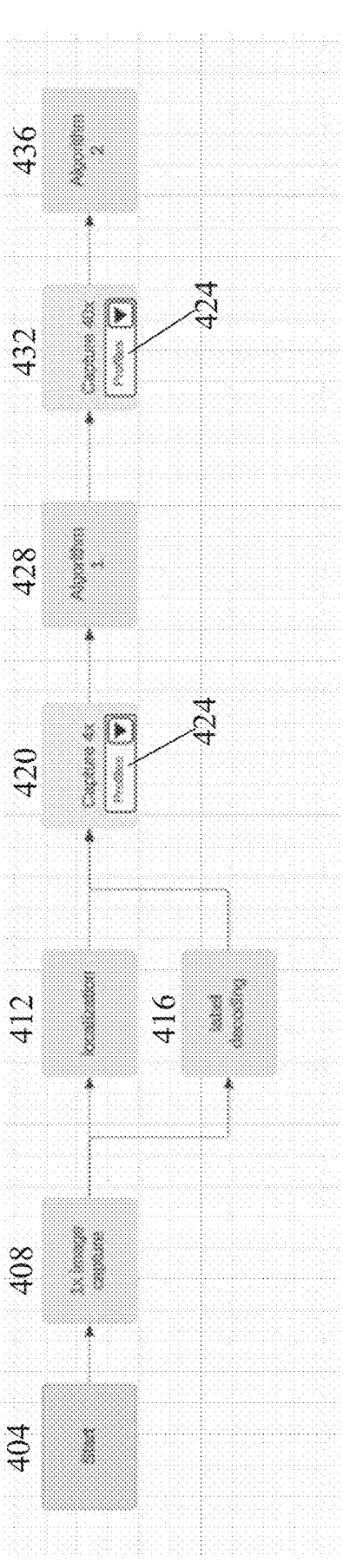
FIG. 4 is an exemplary illustration of at least a containerized module comprising an imaging task.

Referring now to FIG. 4, an exemplary illustration of at least a containerized module 400 comprising an imaging task. In an embodiment, the at least a containerized module 400 includes a start 404. In an embodiment, the at least a containerized module 400 includes a 1× image capture 408 after the start 404. In an embodiment, the 1× image capture 408 is fed into the localization 412 and/or the label decoding 416. In an embodiment, the at least a containerized module 400 may then capture 4× the magnification 420 of the 1× image capture 408. In an embodiment, the capture 4× 420 includes profiles 424. In an embodiment, the next step of the at least a containerized module 400 includes feeding the capture 4× 420 into an algorithm 1 428. In an embodiment, the next step of the at least a containerized module 400 includes capture 40× 432. In an embodiment, the capture 40× 432 includes profiles 424. In an embodiment, the capture 40× is fed into the algorithm 2 436.

Figure 5:
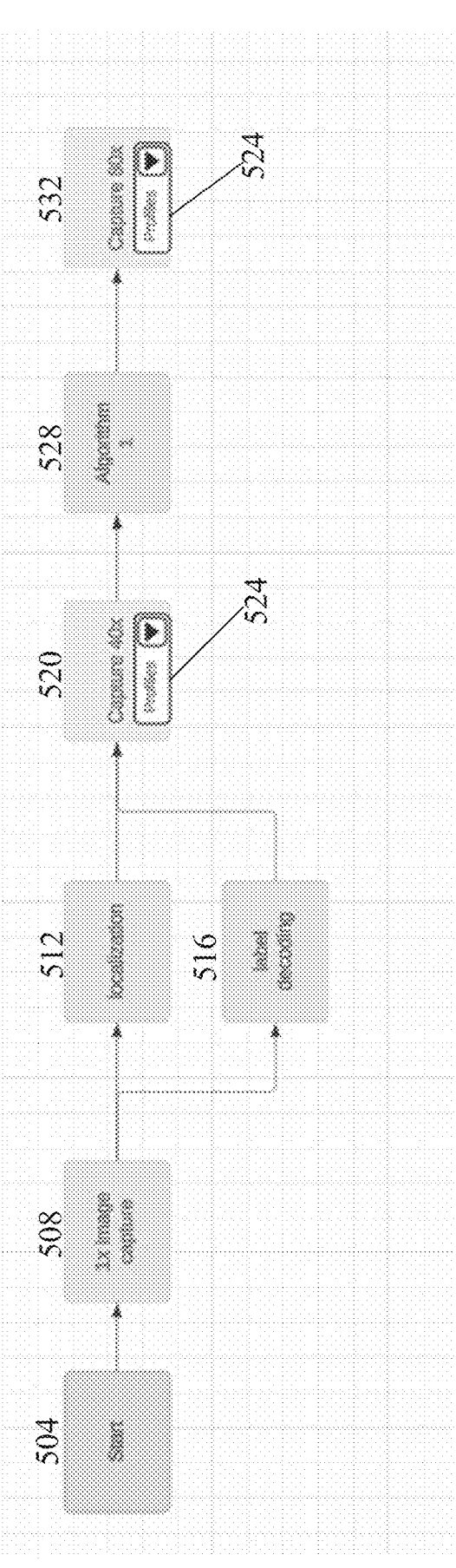
FIG. 5 is an exemplary illustration of at least a containerized module comprising a workflow execution.

Referring now to FIG. 5 is an exemplary illustration of at least a containerized module 500 comprising a workflow execution. In an embodiment, the at least a containerized module 500 includes a start 504. In an embodiment the at least a containerized module 500 includes a 1× image capture 508. In an embodiment, the next step of the at least a containerized module 500 includes feeding the 1× image capture 508 into a localization 512 and/or a label decoding module 516. In an embodiment, the at least a containerized module 500 includes capture 40× 520 that receives the output from the localization 512 and/or the label decoding 516. In an embodiment, the capture 40× 520 includes profiles 524. In an embodiment, the at least a containerized module 500 includes an algorithm 1 528 that receives the output from the capture 40× 520. In an embodiment, the algorithm 1 528 outputs capture 80× 532. In an embodiment, the capture 80× 532 includes profiles 524.

Figure 6:
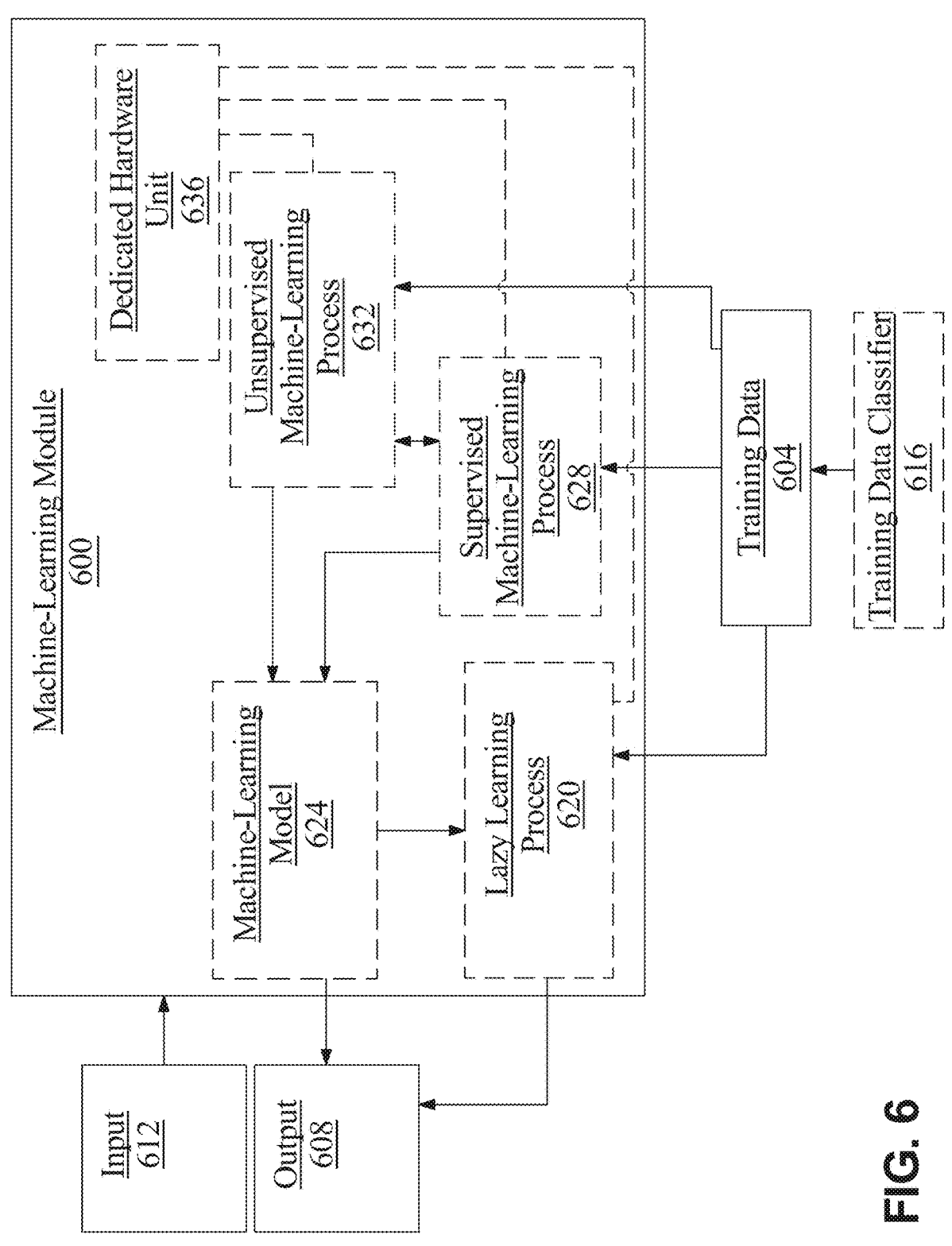
FIG. 6 is a block diagram of an exemplary machine-learning process.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm instantiated in hardware or software logic, data structures, and/or functions that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example historical workflow definitions, execution logs, and performance metrics may be correlated to module dependencies, execution order, and resource requirements.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to identify and segregate workflow components based on criteria such as module dependencies, execution order, and resource utilization patterns, thereby enabling the system to predict bottlenecks and recommend optimized execution strategies.

Still referring to FIG. 6, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 6, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 6, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $\alpha_i$ is aunivute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 6, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 6, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 6, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 6, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 6, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 6, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 6, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 6, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value $X$ has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between $X$ and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 6, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

With further reference to FIG. 6, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 6, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 632 may not require a response variable; unsupervised processes 632may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 6, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 6, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 6, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 6, one or more processes or algorithms described above may be performed by at least a dedicated hardware unit 636. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 636 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 636 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 636 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 7:
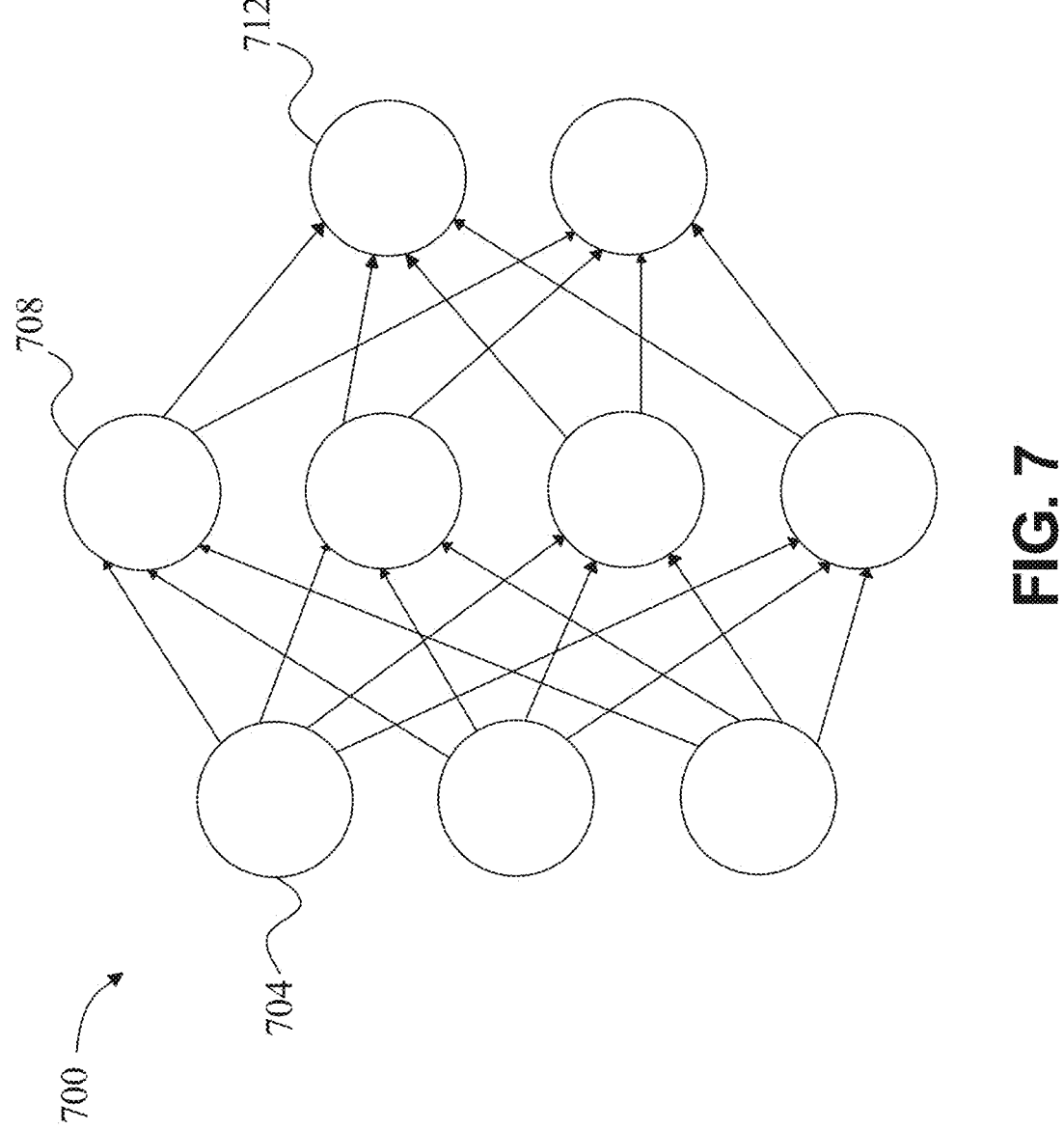
FIG. 7 is a diagram of an exemplary embodiment of a neural network.

Referring now to FIG. 7, an exemplary embodiment of neural network 700 is illustrated. A neural network 700 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 704, one or more intermediate layers 708, and an output layer of nodes 712. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 8:
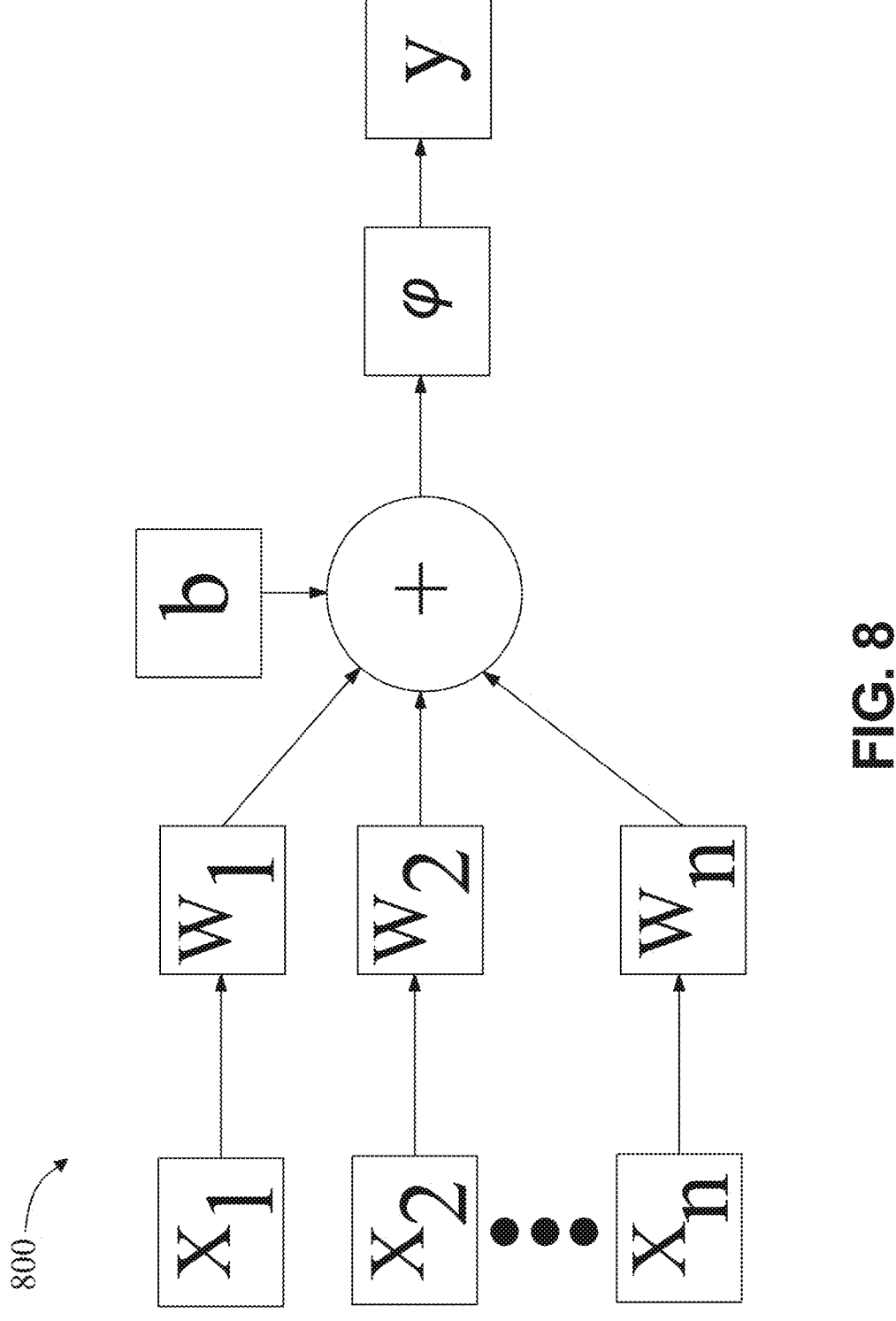
FIG. 8 is a diagram of an exemplary embodiment of a node of a neural network.

Referring now to FIG. 8, an exemplary embodiment of a node 800 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(\alpha x, x)$ for some $\alpha$, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x^*\text{sigmoid}(x)$, a Gaussian error linear unit function such as $f(x)=\alpha(1+\tanh\ (\sqrt{2\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Now referring to FIG. 9, illustrated is an exemplary method 900 for modular data acquisition and analysis. Method 900 for modular data acquisition and analysis may include a step 905 of receiving, from a module database, a library of interoperable modules, wherein each module of the library of interoperable modules is configured to perform at least a specific data processing task. In an embodiment, the interoperable modules may include containerized software components and one or more application programming interfaces (APIs) configured to facilitate communication and data exchange between the first module, the second module, and other system components. This may be implemented, without limitation, as referenced in FIGS. 1-8.

With continued reference to FIG. 9, method 900 may include a step 910 of receiving, from a user interface, a module selection, wherein the module selection includes a selection of a plurality of interoperable modules of the library of interoperable modules. This may be implemented, without limitation, as referenced in FIGS. 1-8.

Still referring to FIG. 9, method 900 may include a step 915 of generating a interface, wherein the interface includes a plurality of visual elements each associated with an interchangeable module of the module selection. This may be implemented, without limitation, as referenced in FIGS. 1-8.

In further reference to FIG. 9, method 900 may include a step 920 of receiving a user input through the interface. This may be implemented, without limitation, as referenced in FIGS. 1-8.

With continued reference to FIG. 9, method 900 may include a step 925 of updating the interface as a function of the user input, wherein updating the interface includes displaying at least a connective element as a function of the user input, wherein the at least a connective element visually connects at least a first visual element of the plurality of visual elements to at least a second visual element of the plurality of visual elements, wherein the first visual element is associated with a first module and the second visual element is associated with a second module. This may be implemented, without limitation, as referenced in FIGS. 1-8.

In an embodiment, method 900 may further include updating at least an operational parameter of the first module and the second module as a function of the user input. In an embodiment, updating at least an operational parameter may include receiving a user input, wherein the user input includes one or more selections of parameters and options that define at least an operational parameter of the first module and the second module, setting an input and an output specification for each module as a function of the at least an operational parameter, defining at least a processing criterion for each module as a function of the at least an operational parameter, establishing one or more execution conditions that govern an operation of each module within the customized workflow, and applying the at least an operational parameter to the first module and the second module to configure their operation within the customized workflow. In an embodiment, the one or more selections of parameters and options that define at least an operational parameter of the first module and the second module are visually displayed at the user interface. In an embodiment, the one or more selections of parameters and options that define at least an operational parameter of the first module and the second module may include a drop-down menu. This may be implemented, without limitation, as referenced in FIGS. 1-8.

Further referencing FIG. 9, method 900 may include a step 930 of defining a customized workflow as a function of the user input, wherein defining the customized workflow includes operatively connecting an output of the first module to an input of the second module. This may be implemented, without limitation, as referenced in FIGS. 1-8.

In continued reference to FIG. 9, method 900 may include a step 935 of saving the customized workflow for subsequent execution. This may be implemented, without limitation, as referenced in FIGS. 1-8. In an embodiment, method 900 may include a step of executing a saved custom workflow as a function of a detected prompt. This may be implemented, without limitation, as referenced in FIGS. 1-8.

In an embodiment, method 900 may include a step of validating a compatibility of the first module and the second module. In an embodiment, validating the compatibility of the first module and the second module may include comparing an output type of the first module to an input type of the second module. In an embodiment, method 900 may further include a step of suggesting one or more incompatibility resolutions as a function of validating the compatibility of the first module and the second module. In an embodiment, suggesting one or more incompatibility resolutions may include determining at least one resolution strategy as a function of an identified incompatibility, providing to a user, using the user interface, one or more incompatibility resolutions, wherein the suggested resolutions comprise recommended changes to module configurations, alternative module selections, and/or middleware integration options, and facilitating the implementation of a selection incompatibility resolution by updating at least an operational parameter of the first module and the second module to restore compatibility. This may be implemented, without limitation, as referenced in FIGS. 1-8.

With further reference to FIG. 9, method 900 may include adjusting, using at least a processor, one or more parameters of an imaging device as a function of an output of the customized workflow. This may be implemented, without limitation, as referenced in FIGS. 1-8.

In an embodiment, method 900 may include a step of managing a custom workflow execution. In an embodiment, managing a custom workflow execution may include interpreting the customized workflow and executing the customized workflow. In an embodiment, interpreting the custom workflow may include parsing a workflow definition file to extract module dependencies, execution order, and resource requirements, generating a representative data structure as a function of parsing the workflow definition file, and determining an optimized execution strategy as a function of the representative data structure. In an embodiment, executing the customized workflow may include assigning each module of the customized workflow an execution state as a function of at least a workflow dependency, queuing modules for execution, wherein sequential tasks are scheduled in order and parallel tasks are executed concurrently as a function of dependency resolution, and invoking each module by sending execution commands and input data to a corresponding module. In an embodiment, managing a custom workflow execution may further include handling error conditions. In an embodiment, handling error conditions may include detecting one or more errors as a function of monitoring execution progress, identifying one or more failure causes, wherein the failure causes include one or more of: missing dependencies, timeout events, and/or resource exhaustion, and triggering a predefined resolution mechanism. This may be implemented, without limitation, as referenced in FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
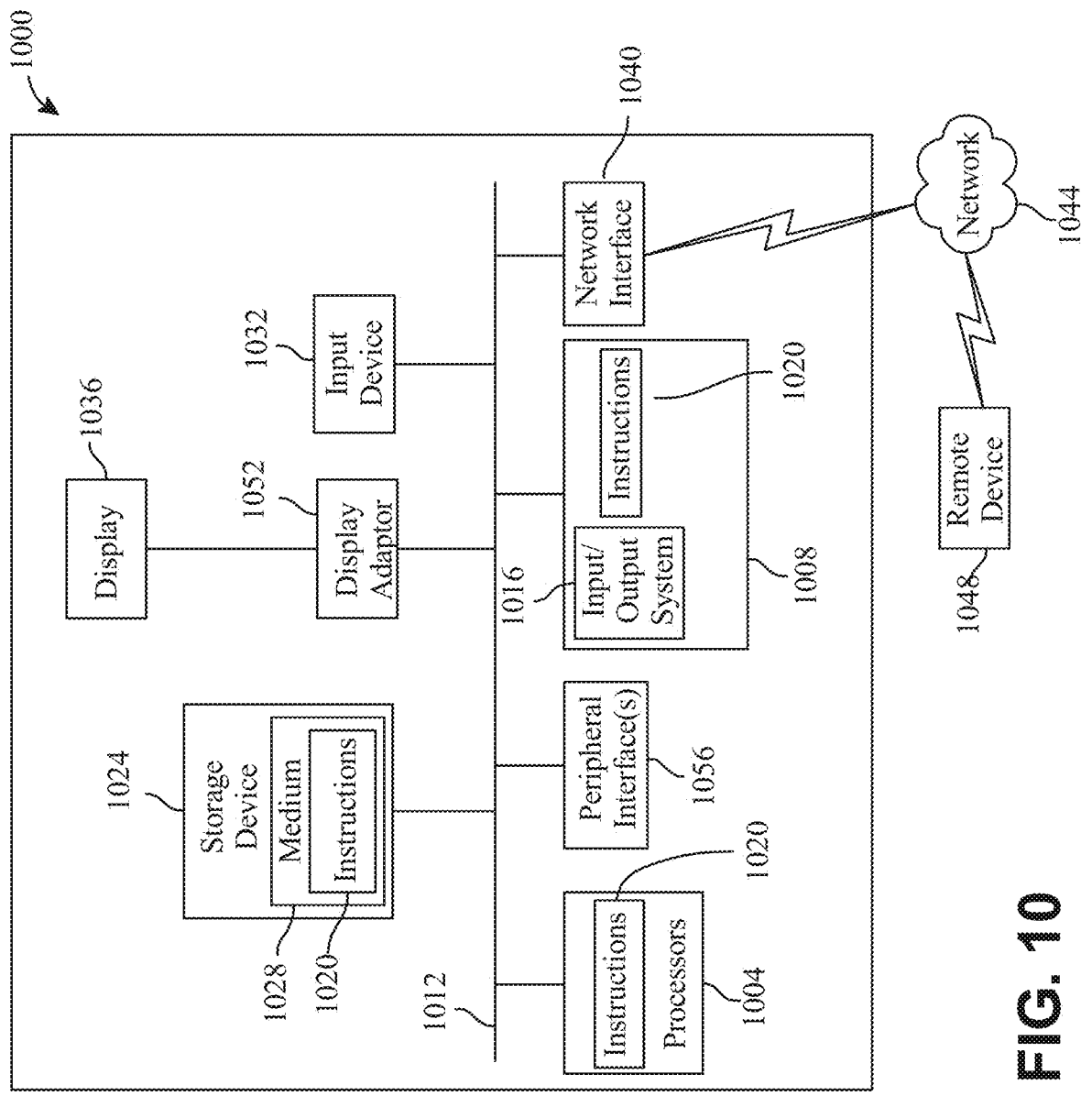
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIRE-WIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A modular data acquisition and analysis system, wherein the system comprises:

at least a processor; and a memory communicatively connected to the at least a processor, wherein the memory contains instructions configuring the at least a processor to:

receive, from a module database, a library of interoperable modules, wherein each module of the library of interoperable modules is configured to perform at least a specific data processing task;

receive, from a user interface, a module selection, wherein the module selection comprises a selection of a plurality of interoperable modules of the library of interoperable modules;

generate an interface, wherein the interface comprises a plurality of visual elements each associated with an interchangeable module of the module selection;

receive a user input through the interface;

update the interface as a function of the user input, wherein updating the interface comprises displaying at least a connective element as a function of the user input, wherein the at least a connective element visually connects at least a first visual element of the plurality of visual elements to at least a second visual element of the plurality of visual elements, wherein the at least a first visual element is associated with a first module and the at least a second visual element is associated with a second module;

define a customized workflow as a function of the user input, wherein defining the customized workflow comprises operatively connecting an output of the first module to an input of the second module;

save the customized workflow for subsequent execution;

manage a custom workflow execution, wherein managing a custom workflow execution comprises:

interpreting the customized workflow, wherein interpreting the custom workflow comprises:

parsing a workflow definition file to extract module dependencies, execution order, and resource requirements;

generating a representative data structure as a function of parsing the workflow definition file; and determining an optimized execution strategy as a function of the representative data structure; and executing the customized workflow, wherein executing the customized workflow comprises:

assigning each module of the customized workflow an execution state as a function of at least a workflow dependency;

queuing modules for execution, wherein:

sequential tasks are scheduled in order; and parallel tasks are executed concurrently as a function of dependency resolution; and invoking each module by sending execution commands and input data to a corresponding module.

2. The system of claim 1, further comprising an imaging device, wherein:

the imaging device is communicatively connected to the at least a processor; and the at least a processor is further configured to adjust one or more parameters of the imaging device as a function of an output of the customized workflow.

3. The system of claim 1, wherein the interoperable modules comprise:

containerized software components; and one or more application programming interfaces configured to facilitate communication and data exchange between the first module, the second module, and other system components.

4. The system of claim 1, wherein wherein validating the compatibility of the first module and the second module comprises comparing an output type of the first module to an input type of the second module.

5. The system of claim 1, wherein managing a custom workflow execution further comprises handling error conditions, wherein handling error conditions comprises:

detecting one or more errors as a function of monitoring execution progress;

identifying one or more failure causes, wherein failure causes comprise one or more of missing dependencies, timeout events, and resource exhaustion; and triggering a predefined resolution mechanism.

6. The system of claim 1, wherein the at least a processor is further configured to execute a saved custom workflow as a function of a detected prompt.

7. A method for modular data acquisition and analysis, wherein the method comprises:

receiving, from a module database, a library of interoperable modules, wherein each module of the library of interoperable modules is configured to perform at least a specific data processing task;

receiving, from a user interface, a module selection, wherein the module selection comprises a selection of a plurality of interoperable modules of the library of interoperable modules;

generating a interface, wherein the interface comprises a plurality of visual elements each associated with an interchangeable module of the module selection;

receiving a user input through the interface;

updating the interface as a function of the user input, wherein updating the interface comprises displaying at least a connective element as a function of the user input, wherein the at least a connective element visually connects at least a first visual element of the plurality of visual elements to at least a second visual element of the plurality of visual elements, wherein the at least a first visual element is associated with a first module and the at least a second visual element is associated with a second module;

defining a customized workflow as a function of the user input, wherein defining the customized workflow comprises operatively connecting an output of the first module to an input of the second module;

saving the customized workflow for subsequent execution;

managing a custom workflow execution, wherein managing a custom workflow execution comprises:

interpreting the customized workflow, wherein interpreting the custom workflow comprises:

parsing a workflow definition file to extract module dependencies, execution order, and resource requirements;

generating a representative data structure as a function of parsing the workflow definition file; and determining an optimized execution strategy as a function of the representative data structure; and executing the customized workflow, wherein executing the customized workflow comprises:

assigning each module of the customized workflow an execution state as a function of at least a workflow dependency;

queuing modules for execution, wherein:

sequential tasks are scheduled in order; and parallel tasks are executed concurrently as a function of dependency resolution; and invoking each module by sending execution commands and input data to a corresponding module.

8. The method of claim 7, further comprising adjusting, using at least a processor, one or more parameters of an imaging device as a function of an output of the customized workflow.

9. The method of claim 7, wherein the interoperable modules comprise:

containerized software components; and one or more application programming interfaces configured to facilitate communication and data exchange between the first module, the second module, and other system components.

10. The method of claim 7, wherein validating the compatibility of the first module and the second module comprises comparing an output type of the first module to an input type of the second module.

11. The method of claim 7, wherein managing a custom workflow execution further comprises handling error conditions, wherein handling error conditions comprises:

detecting one or more errors as a function of monitoring execution progress;

identifying one or more failure causes, wherein failure causes comprise one or more of missing dependencies, timeout events, and resource exhaustion; and triggering a predefined resolution mechanism.

12. The method of claim 7, further comprising executing a saved custom workflow as a function of a detected prompt.

13. A modular data acquisition and analysis system, wherein the system comprises:

at least a processor; and a memory communicatively connected to the at least a processor, wherein the memory contains instructions configuring the at least a processor to:

receive, from a module database, a library of interoperable modules, wherein each module of the library of interoperable modules is configured to perform at least a specific data processing task;

receive, from a user interface, a module selection, wherein the module selection comprises a selection of a plurality of interoperable modules of the library of interoperable modules;

generate an interface, wherein the interface comprises a plurality of visual elements each associated with an interchangeable module of the module selection;

receive a user input through the interface;

update the interface as a function of the user input, wherein updating the interface comprises displaying at least a connective element as a function of the user input, wherein the at least a connective element visually connects at least a first visual element of the plurality of visual elements to at least a second visual element of the plurality of visual elements, wherein the at least a first visual element is associated with a first module and the at least a second visual element is associated with a second module;

update at least an operational parameter of the first module and the second module as a function of the user input, wherein updating at least an operational parameter comprises:

receiving a user input, wherein the user input comprises one or more selections of parameters and options that define at least an operational parameter of the first module and the second module, wherein the one or more selections of parameters and options are:

visually displayed at the user interface; and comprise a drop-down menu;

setting an input and an output specification for each module as a function of the at least an operational parameter;

defining at least a processing criterion for each module as a function of the at least an operational parameter;

establishing one or more execution conditions that govern an operation of each module within a customized workflow; and applying the at least an operational parameter to the first module and the second module to configure their operation within the customized workflow;

define the customized workflow as a function of the user input, wherein defining the customized workflow comprises operatively connecting an output of the first module to an input of the second module; and validate a compatibility of the first module and the second module;

suggest one or more incompatibility resolutions as a function of validating a compatibility of the first module and the second module, wherein suggesting one or more incompatibility resolutions comprises:

determining at least one resolution strategy as a function of an identified incompatibility;

providing to a user, using the user interface, one or more incompatibility resolutions, wherein the suggested resolutions comprise recommended changes to module configurations, alternative module selections, or middleware integration options; and facilitating implementation of a selected incompatibility resolution by updating at least an operational parameter of the first module and the second module to restore compatibility; and save the customized workflow for subsequent execution.

14. A method for modular data acquisition and analysis, wherein the method comprises:

receiving, from a module database, a library of interoperable modules, wherein each module of the library of interoperable modules is configured to perform at least a specific data processing task;

receiving, from a user interface, a module selection, wherein the module selection comprises a selection of a plurality of interoperable modules of the library of interoperable modules;

generating a interface, wherein the interface comprises a plurality of visual elements each associated with an interchangeable module of the module selection;

receiving a user input through the interface;

updating the interface as a function of the user input, wherein updating the interface comprises displaying at least a connective element as a function of the user input, wherein the at least a connective element visually connects at least a first visual element of the plurality of visual elements to at least a second visual element of the plurality of visual elements, wherein the at least a first visual element is associated with a first module and the at least a second visual element is associated with a second module;

updating at least an operational parameter of the first module and the second module as a function of the user input, wherein updating at least an operational parameter comprises:

receiving a user input, wherein the user input comprises one or more selections of parameters and options that define at least an operational parameter of the first module and the second module, wherein the one or more selections of parameters and options are:

visually displayed at the user interface; and comprise a drop-down menu;

setting an input and an output specification for each module as a function of the at least an operational parameter;

defining at least a processing criterion for each module as a function of the at least an operational parameter;

establishing one or more execution conditions that govern an operation of each module within a customized workflow; and applying the at least an operational parameter to the first module and the second module to configure their operation within the customized workflow;

defining a customized workflow as a function of the user input, wherein defining the customized workflow comprises operatively connecting an output of the first module to an input of the second module;

validating a compatibility of the first module and the second module;

suggesting one or more incompatibility resolutions as a function of validating a compatibility of the first module and the second module, wherein suggesting one or more incompatibility resolutions comprises:

determining at least one resolution strategy as a function of an identified incompatibility;

providing to a user, using the user interface, one or more incompatibility resolutions, wherein the suggested resolutions comprise recommended changes to module configurations, alternative module selections, or middleware integration options; and facilitating implementation of a selected incompatibility resolution by updating at least an operational parameter of the first module and the second module to restore compatibility; and saving the customized workflow for subsequent execution.

* * * * *